US011030266B2

(12) United States Patent
Sahadi

(10) Patent No.: US 11,030,266 B2
(45) Date of Patent: Jun. 8, 2021

(54) VENUE RECOMMENDATIONS BASED ON SHARED GUEST TRAITS

(71) Applicant: Blazer and Flip Flops, Inc, San Diego, CA (US)

(72) Inventor: Scott Sahadi, Solana Beach, CA (US)

(73) Assignee: Blazer and Flip Flops, Inc, San Diego, CA (US)

( * ) Notice: Subject to any disclaimer, the term of this patent is extended or adjusted under 35 U.S.C. 154(b) by 218 days.

(21) Appl. No.: 16/008,564

(22) Filed: Jun. 14, 2018

(65) Prior Publication Data

US 2019/0095454 A1     Mar. 28, 2019

Related U.S. Application Data

(63) Continuation-in-part of application No. 15/828,120, filed on Nov. 30, 2017, now abandoned.

(60) Provisional application No. 62/428,303, filed on Nov. 30, 2016.

(51) Int. Cl.
| | |
|---|---|
| *G06F 16/29* | (2019.01) |
| *G06F 16/9537* | (2019.01) |
| *G06Q 10/02* | (2012.01) |
| *G06F 16/248* | (2019.01) |
| *G06F 16/9535* | (2019.01) |

(52) U.S. Cl.
CPC ........ *G06F 16/9537* (2019.01); *G06F 16/248* (2019.01); *G06F 16/29* (2019.01); *G06F 16/9535* (2019.01); *G06Q 10/025* (2013.01)

(58) Field of Classification Search
CPC ............................ G06F 16/9537; G06F 16/248

USPC ....................................................... 707/722
See application file for complete search history.

(56) References Cited

U.S. PATENT DOCUMENTS

| | | | |
|---|---|---|---|
| 10,433,106 | B2 | 10/2019 | Sahadi |
| 10,438,141 | B2 | 10/2019 | Sahadi |
| 2002/0128768 | A1 | 9/2002 | Nakano et al. |
| 2003/0102956 | A1 | 6/2003 | McManus et al. |
| 2004/0218910 | A1 | 11/2004 | Chang |
| 2006/0149459 | A1 | 7/2006 | Masuura et al. |
| 2007/0129082 | A1 | 6/2007 | Thacher |
| 2008/0045138 | A1 | 2/2008 | Milic-Frayling et al. |
| 2008/0306826 | A1* | 12/2008 | Kramer ............. G06Q 30/0212 705/14.14 |

(Continued)

FOREIGN PATENT DOCUMENTS

| | | |
|---|---|---|
| EP | 3 593 088 | 1/2020 |
| WO | WO 2018/165147 | 9/2018 |

OTHER PUBLICATIONS

U.S. Appl. No. 16/010,349 Final Office Action dated Jan. 11, 2019.

(Continued)

*Primary Examiner* — Eliyah S. Harper
(74) *Attorney, Agent, or Firm* — Polsinelli LLP

(57) ABSTRACT

A platform identifies that a first venue attendee is similar to a second venue attendee based on at least one shared trait. The platform identifies an indicator of positivity about a particular point of interest corresponding to the second venue attendee. The platform selects the particular point of interest as a recommended point of interest for the first venue attendee based on the similarity between the first venue attendee and the second venue attendee and the indicator of positivity about the particular point of interest corresponding to the second venue attendee.

20 Claims, 10 Drawing Sheets

(56) References Cited

U.S. PATENT DOCUMENTS

| | | |
|---|---|---|
| 2010/0106801 A1 | 4/2010 | Bliss et al. |
| 2010/0225469 A1 | 9/2010 | Yoshioka et al. |
| 2011/0046881 A1 | 2/2011 | Karaogz |
| 2011/0307547 A1 | 12/2011 | Backer et al. |
| 2012/0064919 A1 | 3/2012 | Purdy |
| 2012/0116863 A1 | 5/2012 | Boss et al. |
| 2013/0024203 A1 | 1/2013 | Flores et al. |
| 2013/0158860 A1 | 6/2013 | Gum |
| 2014/0274136 A1 | 9/2014 | Edge et al. |
| 2014/0280060 A1 | 9/2014 | Campbell et al. |
| 2014/0324488 A1 | 10/2014 | Boccelli |
| 2014/0358632 A1* | 12/2014 | Graff ............... G06Q 30/0224 705/7.29 |
| 2015/0081348 A1 | 3/2015 | Avera et al. |
| 2015/0081617 A1* | 3/2015 | Shaik ............... G06Q 30/0241 707/602 |
| 2015/0088622 A1* | 3/2015 | Ganschow ......... G06Q 30/0252 705/14.5 |
| 2015/0241238 A1 | 8/2015 | Bass et al. |
| 2015/0324400 A1* | 11/2015 | Sheck ................... H04W 4/80 707/795 |
| 2016/0021507 A1 | 1/2016 | Gaines |
| 2016/0093334 A1 | 3/2016 | Kim et al. |
| 2016/0116292 A1 | 4/2016 | An |
| 2016/0155310 A1 | 6/2016 | Joao et al. |
| 2016/0191666 A1 | 6/2016 | Roireau et al. |
| 2016/0307265 A1 | 10/2016 | Seaward et al. |
| 2016/0330290 A1* | 11/2016 | Flores ..................... H04L 67/06 |
| 2016/0353235 A1 | 12/2016 | Williams et al. |
| 2016/0353249 A1 | 12/2016 | Khatam et al. |
| 2017/0045364 A1 | 2/2017 | Trivedi |
| 2017/0048664 A1 | 2/2017 | Zhang et al. |
| 2017/0054849 A1 | 2/2017 | Torre et al. |
| 2017/0178034 A1* | 6/2017 | Skeen ................... G06Q 20/384 |
| 2017/0178084 A1 | 6/2017 | Barreira Avegliano et al. |
| 2017/0180488 A1* | 6/2017 | Goldstein ............... H04L 67/16 |
| 2017/0270734 A1 | 9/2017 | Geraghty et al. |
| 2017/0343361 A1 | 11/2017 | Kandangath et al. |
| 2017/0353582 A1 | 12/2017 | Zavesky et al. |
| 2018/0032997 A1 | 2/2018 | Gordon et al. |
| 2018/0033077 A1 | 2/2018 | Villatoro et al. |
| 2018/0240151 A1 | 8/2018 | D'Andrea et al. |
| 2018/0349393 A1 | 12/2018 | Oberdorfer |
| 2018/0349808 A1 | 12/2018 | Sahadi |
| 2018/0352373 A1 | 12/2018 | Sahadi |
| 2018/0352378 A1 | 12/2018 | Sahadi |
| 2019/0095454 A1 | 3/2019 | Sahadi |
| 2019/0347911 A1 | 11/2019 | Linguanti et al. |

OTHER PUBLICATIONS

U.S. Appl. No. 16/010,355 Office Action dated Feb. 26, 2019.
U.S. Appl. No. 15/913,402 Office Action dated Nov. 15, 2019.
U.S. Appl. No. 15/980,733 Office Action dated Nov. 21, 2018.
U.S. Appl. No. 16/596,141, Scott Sahadi, Venue Traffic Flow Management, filed Oct. 8, 2019.
Cheng et al.; "The Adaptive Recommendation Mechanism for Distributed Group in Mobile Environments", IEEE Transactions on Systems, Man, and Cybernetics—Part C: Applications and Reviews, vol. 42, No. 6, Nov. 2012.
PCT Application No. PCT/US2018/021130 International Search Report and Written Opinion dated Jun. 26, 2018.
PCT Application No. PCT/US2018/021130 International Preliminary Report on Patentability dated Jun. 26, 2018.
U.S. Appl. No. 16/010,355 Final Office Action dated Jul. 12, 2019.
European Application No. 18763222.9 Extended European Search Report dated Dec. 16, 2020.
U.S. Appl. No. 15/913,402 Office Action dated Jan. 13, 2021.

* cited by examiner

VENUE RECOMMENDATIONS BASED ON SHARED GUEST TRAITS

CROSS-REFERENCE TO RELATED APPLICATIONS

The present application is a continuation-in-part of U.S. application Ser. No. 15/828,120 filed Nov. 30, 2017 and entitled "Development, Deployment and Real Time Management of Highly Personalized Experiences Occurring at Managed Locations," and claims the priority benefit of U.S. provisional application No. 62/428,303 filed Nov. 30, 2016 and entitled "Development, Deployment and Real Time Management of Highly Personalized Experiences Occurring at Managed Locations," the disclosures of which are hereby incorporated by reference.

BACKGROUND

1. Field

The present teachings are generally related to an experience development and management platform. More specifically, the present teachings relate to development, deployment and real time management of highly personalized experiences occurring at managed locations.

2. Description of the Related Art

Locations that host visitors provide a wide range of experiences. The venues often have special events such as entertainment performances, provide attractions, such as rides, and provide various goods and services, including foods, beverages, souvenirs and other merchandise, and many others. Items available at any given point of interest within a location often change throughout a day or season, and other changing factors, such as waiting lines, can further impact a guest or customer experience. In such a complex and changing environment, it is very difficult to provide visitors with relevant information at all times as the visitors move from point-to-point within the location managed by a host. Also, as many venues are large and complex, challenges exist for personnel to keep track of what is happening throughout a location at a given time and to help each visitor have a favorable experience throughout a visit, and challenges exist for visitors to communicate among themselves or communicate with the personnel of a venue. Most locations that host these experiences provide static paper maps, brochures or signs that provide guests information about a location and encourage engagement in one or more activities at the location. Some provide additional information via website or apps that contain general information about the venue and some updated information, such as event schedules.

However, the quantity of experiences and points of interest at venues can be overwhelming for venue attendees. Information concerning these experiences and points of interest can be difficult or impossible for attendees to find, as not all of it is publically accessible, and any information that is available might be difficult to parse in any meaningful way. As such, attendees, especially in groups, often must spend long periods of time deliberating and planning routes and itineraries that makes sense based on their locations, their likes, their dislikes, and so forth—and even so, they still might make poor choices in light of missing inventory at restaurants, long queues at certain points of interest, or other discouraging situations. As such, a system is needed to intelligently make recommendations to users and to groups of users based on different types of information about a venue and the user(s).

SUMMARY

A method for itinerary personalization for a first venue attendee in a predetermined event venue area is claimed. The method includes receiving, from a mobile device associated with the first venue attendee, a location of the mobile device associated with the first venue attendee. The method also includes retrieving a plurality of venue attendee profiles including at least a first venue attendee profile corresponding to the first venue attendee and a second venue attendee profile corresponding to a second venue attendee, wherein each venue attendee profile identifies a plurality of traits about one of the plurality of venue attendees. The method also includes identifying that the first venue attendee is similar to the second venue attendee based on identifying at least a first shared trait common to both the first venue attendee profile and the second venue attendee profile. The method also includes retrieving locations of a plurality of points of interest located within the predetermined event venue area. The method also includes selecting a recommended point of interest for the first venue attendee from the plurality of points of interest based on the recommended point of interest being within a predetermined range of the location of the mobile device associated with the first venue attendee and based on identifying an indicator of positivity associated with the recommended point of interest and corresponding to the second venue attendee. The method also includes sending at least the recommended point of interest to the mobile device associated with the first venue attendee.

A system that generates a personalized itinerary for a venue attendee in a predetermined event venue area is claimed. The system includes a communication transceiver that receives a location of a mobile device associated with the first venue attendee and sends a recommended point of interest to the mobile device associated with the first venue attendee. The system also includes a memory storing instructions, locations of a plurality of points of interest located within the predetermined event venue area, and a plurality of venue attendee profiles including at least a first venue attendee profile corresponding to the first venue attendee and a second venue attendee profile corresponding to a second venue attendee, wherein each venue attendee profile identifies a plurality of traits about one of the plurality of venue attendees. The system also includes a processor, wherein execution of the instructions by the processor causes the processor to perform system operations. The system operations include identifying that the first venue attendee is similar to the second venue attendee based on identifying at least a first shared trait common to both the first venue attendee profile and the second venue attendee profile and selecting the recommended point of interest for the first venue attendee from the plurality of points of interest based on the recommended point of interest being within a predetermined range of the location of the mobile device associated with the first venue attendee and based on identifying an indicator of positivity associated with the recommended point of interest and corresponding to the second venue attendee.

Another method for generating a personalized itinerary for a venue attendee in a predetermined event venue area is claimed. The method includes receiving a location of a mobile device associated with the first venue attendee.

storing profile information identifying a first plurality of traits of the first venue attendee and a second plurality of traits of a second venue attendee. The method also includes identifying a first shared trait that is common to both the first plurality of traits and the second plurality of traits. The method also includes storing locations of a plurality of points of interest located within the predetermined event venue area. The method also includes selecting a recommended point of interest from the plurality of points of interest based on identifying an indicator of positivity about the recommended point of interest corresponding to the second venue attendee, wherein the recommended point of interest is within a predetermined range of the location of the mobile device associated with the first venue attendee. The method also includes sending at least the recommended point of interest to the mobile device associated with the first venue attendee.

DETAILED DESCRIPTION

Figure 1:
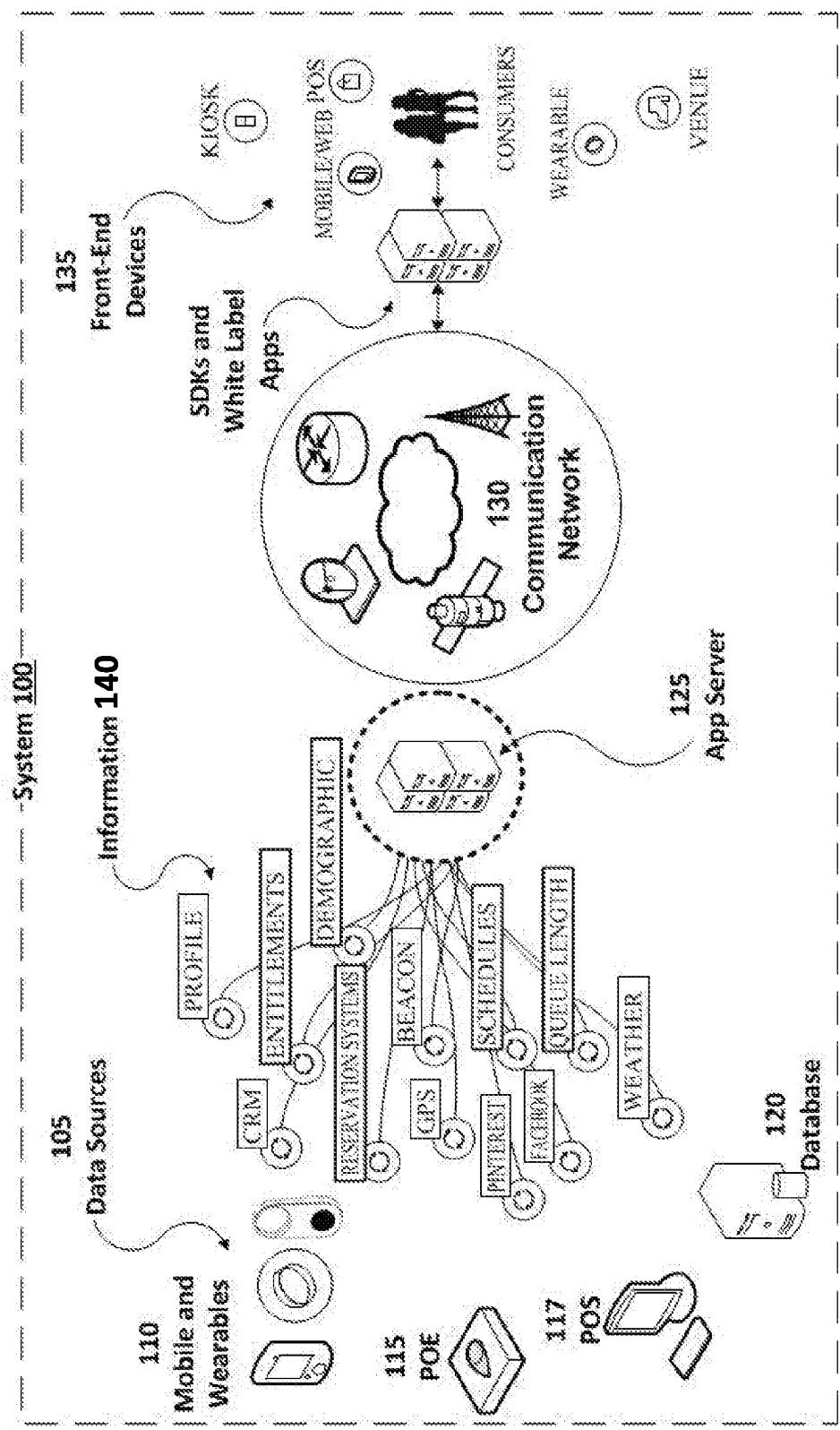
FIG. 1 illustrates a system architecture for personalizing journeys and itineraries.

A platform is described herein with various methods, systems, components, processes, services and the like that facilitate the design, creation, delivery and management of experiences at locations and venues that are optionally managed by a host. The platform generates a personalized itinerary and corresponding map for a user within a venue. The personalized itinerary includes at least one recommended point of interest, the recommendation generated based on a location of the recommended point of interest relative to a location of the user, and based on a comparison between user profile information concerning the user and point of interest information concerning the recommended point of interest. The recommended point of interest may also be recommended based on estimated wait times, queue lengths, or other information obtained by the platform's servers.

Locations, areas, or venues as described herein may include entertainment venues, malls, stores, theme parks, campuses, cruise ships, schools, universities, arenas, public parks, resorts, airports, terminals, tourist attractions, monuments, stations, markets, districts (e.g., municipal districts), stadiums, predetermined geographical areas, cruise routes, travel routes, cities, counties, countries, continents, or a combination thereof. These and other locations are collectively referred to throughout this disclosure interchangeably as "venues,", "areas," or "locations," and reference to any of the foregoing should be understood to encompass one or more of these, except where context indicates otherwise. Such locations, areas, or venues are hosted by parties such as commercial enterprises, non-profit entities, educational entities, and federal, state and municipal governments, collectively referred to herein as "hosts," "managers," or "owners." Such locations attract and host thousands of people (referred to herein as "visitors," "guests," and "customers") and provide a wide range of experiences. Such locations, areas, or venues may have predetermined boundaries that may be used as geofence boundaries that, when crossed by a location-tracking device whose location is determined via Global Navigation Satellite System (GNSS) or proximity to short-range wireless beacon devices, may trigger actions as described further herein.

The platform of the present disclosure enables the creation of personalized, relevant experiences that are delivered to guests at one or more points of interest within a location at the right time, taking into account a wide range of dynamic factors. By delivering a series of such experiences over the course of a visit, through a dynamic, personalized itinerary, a host can provide guests with an optimized overall experience while using the resources that are required to provide such experiences more efficiently and more profitably.

The present disclosure further includes a wide range of systems, methods, components, processes, and the like that facilitate the development and operation of the platform. For example, the platform may include methods and systems for developing and managing a user profile or identity, such as based on demographic factors, past history, and user behavior, such as to enable provision of personalized experiences, recommendations, itineraries and communications. The platform may include facilities for automating the creation, assembly, delivery, and management of experiences, including facilities for connecting to and integrating with relevant systems (such as inventory systems, ticketing and entitlement management systems, reservations systems, scheduling systems, and many others), for extracting, transforming and loading data to and from such systems, and for using machine learning to automate the completion of various methods, such as generation of relevant recommendations, customization of communications, optimization of monetization, optimization of experiences, optimization of itineraries, and others.

The platform may further include various methods for facilitating communication among hosts, personnel and visitors. These methods include determining that a user has entered a managed location by a computing device and identifying user contacts within the venue. The methods further include transmitting messages and other content to computing devices associated with each user contact within the venue regarding the user within the venue.

The present teachings further include methods for providing a dynamic map that is configured for display on a computing device, including providing graphical images of a venue and of relevant points of interest within the venue, with various interface elements, such as icons, logos, directional indicators, and the like that facilitate understanding about the venue. The map may provide a navigation interface, such as for routing a user to one or more points of interest in a location, such as guiding a user through one or more steps of an itinerary. The map may further include providing a visual update of the user on the map as the visitor moves through the venue and providing a personalized message or other content to the visitor regarding the venue, such as based on user data collected while the user is in the venue or other information about the user.

The present teachings also include methods for determining wait times and using wait time information as a factor for designing and delivering experiences. The methods may include receiving direct wait time data for a point of interest, receiving location map data, and receiving additional data including at least one of network traffic measurement data, entitlement redemption data, and show or event schedule data. The methods may further include determining a wait time and reporting the wait time to a remote device.

The present teachings may further include methods for engaging with a user within a venue. The method may include setting a first rule for a promotion provided by an application executing on a server. The first rule may indicate to which users within a venue the promotion will be available. The method may further include communicating the promotion to a plurality of user devices within the venue and that correspond to the first rule. The user devices may be associated with users within the venue. The method may also include updating the promotion before the promotion ends for at least one of the plurality of users.

The terms "a" or "an," as used herein, are defined as one or more than one. The term "another," as used herein, is defined as at least a second or more. The terms "including" and/or "having", as used herein, are defined as comprising (i.e., open transition).

The present teachings generally include design, creation, development, assembly, provisioning, delivery and management of one or more personalized, timely experiences at one or more points of interest in one or more managed or hosted locations. For convenience these and other elements and capabilities of the platform are collectively referred to herein as "management" or "real time management" of experiences, except where context indicates otherwise. A managed location can include any of a wide variety of locations or venues as disclosed throughout this disclosure or known by those of skill in the art, such as a venue, stadium, arena, public park, public space or district, concert hall, amusement park, theme park, water park, block party, house party, beer garden, mall, store, monument, tourist attraction, and many others. Managed locations can also include multiple premises that as a whole can constitute managed locations, such as, without limitation, a series of franchised locations. Managed locations can also include mobile platforms such as watercraft, cruise liners, trains, and aircraft. It will be appreciated in light of the disclosure that an entertainment venue, such as a theme park, is but one managed location in which the present teachings can be implemented. Managed locations can also include locations (one or many) of an enterprise, brand or other entity where physical assets of the enterprise are located. Managed locations can also include any venue, store location, mall, theme park, city park, village, campus, cruise ship dock, airport terminals, parking structures, and many others.

The platform herein identifies that a first venue attendee is similar to a second venue attendee based on at least one shared trait. The platform identifies an indicator of positivity about a particular point of interest corresponding to the second venue attendee. The platform selects the particular point of interest as a recommended point of interest for the first venue attendee based on the similarity between the first venue attendee and the second venue attendee and the indicator of positivity about the particular point of interest corresponding to the second venue attendee.

FIG. 1 illustrates a system architecture for personalizing journeys and itineraries. Uses of the system 100 of FIG. 1 may include live, dynamic mapping that utilizes branding, including hyper-local marketing. The system 100 of FIG. 1 includes an ecosystem of data sources 105 such as mobile devices and/or wearable devices 110, point-of-entry/-exit (POE) terminals 115, point-of-sale (POS) terminals 117, and databases 120. Communicatively coupled to data sources 105 are back-end application servers 125. In system 100, application servers 125 can ingest, normalize and process data collected from mobile devices 110 and various POS or POE terminals 115. Types of information 140 gathered from data sources 105 and processed by back-end application servers 125 are generally inclusive of identity information such as user profiles, customer relationship management (CRM) data, entitlements, demographics, reservation systems and social media sources like Pinterest™ and Facebook™ data. Information 140 gathered from data sources 105 and processed by back-end application servers 125 also includes proximity/location information gathered using GNSS receivers such as Global Positioning System (GPS) receivers of mobile/wearable devices 100 and/or via proximity between mobile/wearable devices 100 and beacons that emit short-range wireless signals (e.g., Bluetooth®, Bluetooth® LE, iBeacon, NFC, RFID, WiFi, radio). Information 140 gathered from data sources 105 and processed by back-end application servers 125 also includes time-related data, such as schedules, weather, and queue length.

Mobile and wearable devices 110 can execute applications via processors that make use of sensors and receivers of the respective mobile and wearable devices 110 to generate customer engagement data and then share that customer engagement data as the information 140 to the application server(s) 125. The customer engagement data/information 140 may include, for example, current and prior physical locale within a venue as well as wait times and travel times (e.g., how long was a customer at a particular point in a venue and how long did it take the customer to travel to a further point in a venue), paths to certain point on the map, and other information. Mobile devices 110 are inclusive of wearable devices. Wearable devices (or 'wearables') are any type of mobile electronic device that can be worn on the body or attached to or embedded in clothes and accessories of an individual, such as wristwatches, wristbands, armbands, chest bands, ankle bands, glasses, head-worn devices, devices integrated into clothing (including shoes, pants, shirts, jackets, hats, and others), and others. Processors and sensors associated with a wearable can gather, process, display, and transmit and receive information, including location information, motion information and physiological information, among many other types.

With continued reference to FIG. 1, the POS data may be gathered at point of entry (POE) 115, or point of sale (POS) terminals 117 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110. POE terminals 115 and POS terminals 117 alike may include or be connected to beacon devices using short-range wireless communication transceivers to communicate with the mobile and wearable devices 110 and thereby determine a location of the mobile and wearable devices 110 (or velocity, or heading, or other information 140 concerning the mobile and wearable devices 110) relative to known location of the beacon based on a known signal strength (and a known signal range at the known signal strength) of the beacon.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of a communications network 130, either directly through the communication network 130 or software development kit (SDK) instructions called by particular software applications (e.g., white label apps) run at the app server(s) 125, at the front-end devices 135, at the data sources 105, at a device along the way in the communication network 130, or some combination thereof. The communications network 130 may be a local, proprietary network (e.g., an intranet) and/or may be a part of a larger wide-area network. The communication network 130 may include a variety of connected computing devices that provide one or more elements of a network-based service. The communications network 130 may include actual server hardware or virtual hardware simulated by software running on one or more actual machines thereby allowing for software controlled scaling in a cloud environment.

The communications network 130 may allow for communication between data sources 105 and front-end devices 135 via any number of various communication paths or channels that collectively make up the communications network 130. Such paths and channels may operate utilizing any number of standards or protocols including TCP/IP, 802.11, Bluetooth, iBeacon, GSM, GPRS, 4G, and LTE. The communications network 130 may be a local area network (LAN) that can be communicatively coupled to a wide area network (WAN) such as the Internet operating through one or more network service provider.

Information received and provided over a communications network 130 may come from other information systems such as GPS, cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy or iBeacon beacon with real time proximity detection that can be correlated to latitude/longitude measurements for fixed beacon locations.

Additional use cases may include phone-based, GPS, real-time location (latitude/longitude) measurements, phone geo-fence-real time notifications when a device is moving into or out of location regions, Wi-Fi positioning involving user location detection based on Wi-Fi signal strength (both active or passive), RFID/Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above. In some cases, front-end devices 135 may include any one of the data sources 105 providing the information 140 to the app server 125, such as one of the mobile/wearable devices 110, one of the points of exit/entry 115, one of the points of sale 117, or one of the databases 120.

The system 100 of FIG. 1 provides services for personalizing journeys and itineraries. For example, a dynamic map including markers corresponding to various captured photos, recorded videos, transaction receipts, messages, social media posts, and other events may be generated at a mobile computing device 110, at one or more application server(s) 125, at one or more front-end-devices 135, or some combination thereof. Any of the devices illustrated in FIG. 1, including the mobile computing devices 110, application server(s) 125, and front-end devices 135 may include at least one computing system 800, or may include at least some of the components illustrated in FIG. 8.

Figure 2:
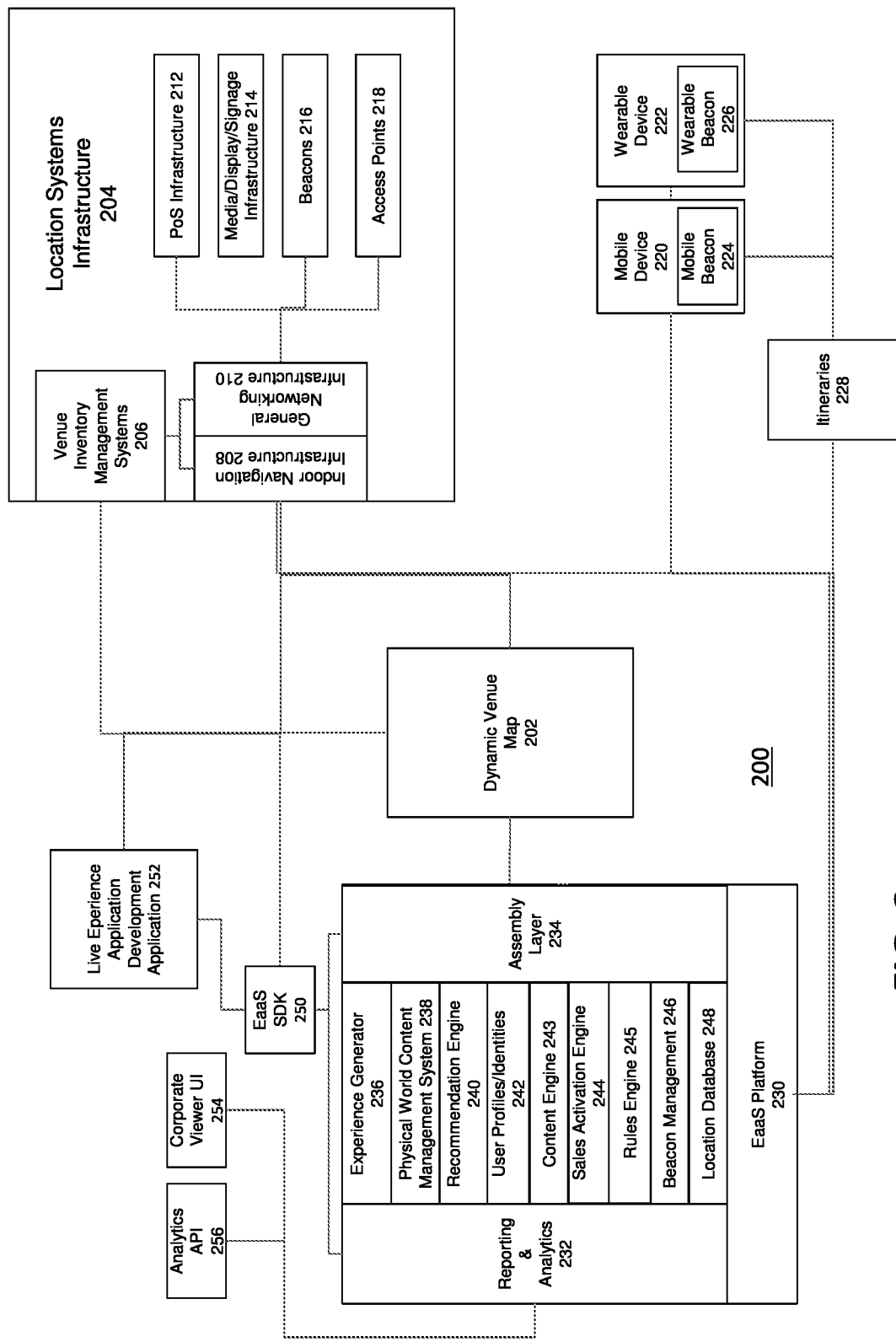
FIG. 2 illustrates a technology stack for real-time management of experiences with respect to personalized itineraries.

FIG. 2 illustrates a technology stack for real-time management of experiences with respect to personalized itineraries. More specifically, FIG. 2 depicts a physical world content management system 200. The physical world content management system 200 can include a dynamic venue map 202 and various elements of a venue systems infrastructure 204. The management system 200 can also include a mobile device 220 and a wearable device 222. The management system 200 can also manage various itineraries 228, such as for users or groups of users. The management system 200 can include an experience as a service (EaaS) platform 230 with a wide range of capabilities, as well as facilities for various interfaces to the platform 230, such as interfaces for analytics 256 and for other users of an enterprise, such as through a corporate or commercial viewer 254. The management system 200 may also include an EaaS software development kit (SDK) 250 for designing, developing and assembling experiences. The management system 200 can further include a live experience development application 252 for developing experiences.

The EaaS platform 230 of FIG. 2 may be run via the app server(s) 125 of FIG. 1. The mobile device 220 and wearable device 222 of FIG. 2 may act as the mobile/wearable device 110 of FIG. 1 and/or the front-end device 135 of FIG. 1. The locations system infrastructure 204 of FIG. 2 may include the element(s) of the data sources 105 and/or the app server 125 of FIG. 1.

The dynamic venue map 202 can connect to or be integrated with the EaaS platform 230, such that the experiences created, delivered and managed using the platform can include elements presented on the venue map 202, such as to visitors and to staff of the host. The SDK 250 and development application 252 may also generate and tweak a venue map 202, such as to allow developers to consider and integrate points of interest, routes, inventory locations, service locations, and other factors on the map when designing and delivering experiences. The venue map 202 may integrate any of the information 140 discussed with respect to FIG. 1 and may also connect to or integrate with the systems infrastructure 204 of a location, such as to exchange data with elements of the systems infrastructure 204 that are relevant to experiences, such as sales and inventory data contained in point of sale (POS) infrastructure 212, to exchange location data with location-specific or navigation infrastructure elements 208, such as beacons 216 and access points 218 (e.g., WiFi hotspots and/or cell towers), and to coordinate with content on media and signage infrastructure 214. The venue map 220 may also connect to mobile devices 220, wearable devices 222 and the itineraries 228, so that map information can be presented on a visitor's devices, with appropriate itinerary information, messages, and the like, optionally presented in context using the map 202 as a presentation layer. The itineraries 228 may be presented as lists, as a set of directions from the user's location to each consecutive POI/experience, or as a map that points out the user's location relative to each consecutive POI/experience (as in FIG. 4, FIG. 5, FIG. 6). In many aspects of the present teachings, the dynamic venue map 202 can connect to the EaaS platform 230 through the physical world content management system 238 and through use of the EaaS SDK 250, which may include various elements for creating, assembling, delivering and managing experiences.

In aspects of the present teachings, the location systems infrastructure 204 can include a venue inventory management system 206 and an indoor navigation infrastructure 208. Moreover, the location systems infrastructure 204 can make use of general networking infrastructure 210. The location systems infrastructure 204 can include a POS infrastructure 212, a media/display/signage infrastructure 214, beacons 216, and access points 218. The venue inventory management systems 206 can connect to the dynamic venue map 202, the indoor navigation infrastructure 208 and general networking infrastructure 210. The general networking infrastructure 210 can connect to a POS infrastructure 212, the media/display/signage infrastructure 214, the beacons 216, the access points 218, and the like.

The mobile device 220 can include a mobile beacon 224. The mobile device 220 can also connect to a wearable device 222 and can access the itineraries 228, such as to present an itinerary of a user or group on the device. The mobile device 220 can also connect to the EaaS Platform 230, the dynamic venue map 202, the location systems infrastructure 204 and the EaaS SDK 250 to provide and receive data necessary to manage an experience, to receive and redeem entitlements, to communicate about experiences, to receive recommendations, to receive itineraries, and the like. In additional aspects of the present teachings, the mobile device 220 or wearable device 222 can connect to the location systems infrastructure 204, such as using the indoor navigation infrastructure 208 or using other location capabilities, such as global positioning system (GPS) or cellular triangulation, so that the host can maintain precise understanding of the user's location at all times. In aspects, the mobile device 220 of wearable device 222 can connect to the location systems infrastructure 204 through the venue inventory management systems 206, such as where the mobile device 220 or wearable device 222 is used to order or purchase items, either at a point of sale or point of interest, or remotely.

In various embodiments, the wearable device 222 can include or comprise a wearable beacon 226, such as to provide location information about the position of the wearer of the wearable device 222, such as by detecting proximity to one or more points of interest (such as by detecting or interacting with wireless infrastructure capabilities of the venue that are known to be located at the points of interest via NFC, Bluetooth™, Bluetooth™ Low Energy (BTLE), WiFi, iBeacon, or other wireless signals, or other location methods, such as cellular triangulation, GPS, dead reckoning, user reporting of location, etc.). The wearable device 222 can connect to or interact with the mobile device 220 and one or more itineraries 228 (such as to receive information about current and upcoming itinerary items, such as the nature of the items, locations, times and routing information within the venue to the next or subsequent item, as well as to receive information about entitlements, such as tickets, that may be used, via the wearable device 222, in connection with items on the itinerary). The EaaS platform 230 can include or connect to a reporting and analytics facility 232, which may take information from various components of the EaaS platform 230, or other elements that interact with the EaaS platform 230 and allow the generation of reports and analytic results on the data, such as information about what experiences have been recommended, what experiences have been undertaken by users, what entitlements have been redeemed, what goods or services have been purchased, what profits have been made, and the like, in each case optionally presented by time period, by location, by visitor, by group, by demographic factor, and by many other variables. The analytics facility 232 may thus allow users, such as marketing staff of a host, to analyze the impact of any of the factors captured in the various data sets used by the EaaS platform 230 that may contribute to creation, recommendation, assembly, delivery, and completion of experiences, as measured by contribution of the factors any of a wide variety of measures of performance (e.g., number of visits, duration of visits, frequency of visit, visitor satisfaction ratings, profit per visitor, profit per time period, gross sales, net sales, gross profits, net profits, amounts paid by sponsors, rates paid by sponsors for sponsorship, and many other). Analytics may include visualizations, such as heat maps, as well as presentations of results as an overlay on the dynamic venue map, such as showing which attractions or points of interest are most popular, most profitable, or the like. The analytics facility 232 may include capabilities for undertaking a wide range of analytic techniques, including A/B testing techniques, correlation analysis (including use of similarity matrices, such as for collaborative filtering, as well as various known statistical techniques), analysis based on distributions (e.g., normal distributions), probabilistic analysis (e.g., random walk and similar algorithms), and many others. Output and results from the analytics facility 232 may be used to optimize recommendations, to suggest new experiences, to improve performance of staff, to improve selection of inventory, to optimize patterns of traffic within a venue, to improve profits and yield, and for many other purposes.

Recommendations of experiences or points of interest (POI) may be made based on user's location, on estimated time for the user to travel to the point of interest, on wait times at the point of interest, on queue lengths at the point of interest, on popularity of the experience/POI, on the user never having been to the experience/POI before, on the user having been to the experience/POI more than a predetermined number of times already (indicating that the user likes the experience/POI), on expected weather at the point of interest, on the experience or point of interest being related to something that the user likes according to profile information concerning the user, on the experience or point of interest being unrelated to something that the user dislikes according to profile information concerning the user, on the type of experience/POI, on an amount of time since the was last at an experience/POI of the same type exceeding a predetermined period of time, on inventory at the POI, or some combination thereof. Recommendations of experiences and related points of interest may be made based on such information concerning more than one user as well, so that when a family is traveling together, for example, the likes and dislikes of each member of the family (and other information as discussed above concerning each member of the family) can be taken into account to find optimal recommendations of experiences and points of interest.

A user's experience can importantly include experience with a particular venue, or a particular type of venue. For example, the user profile can accumulate, and reflect, the user's experience with a theme park, with theme parks of a particular type, with a cruise ship, with visits to locations within venues or around the world, and the like. Among other things, the user experience can keep track of what a user has done during past visits, including capturing positive and negative ratings, so that positive past experiences can be added to an itinerary or recommended at appropriate times during a subsequent visit, or so that similar experiences can be recommended or added to an itinerary at a new venue. The user experience can also capture information about a current visit, such as indicating that a user has already experienced a certain attraction, event, service, or the like, so that the EaaS platform 230 can steer the user to additional experiences or re-direct the user to favorite experiences at appropriate times.

The user profile can also account for user interests, including interests in particular types of dining, foods or beverages, interests in entertainment options (such as preferences in music, dancing, magic shows, animal shows, and many others), interests in attractions (such as thrill rides, water rides, arts, fireworks, fountains, historical information, and many others), interests in particular characters, people or topics, and many others. These can be used, for example, to identify relevant attractions that are either directly responsive to the user's interests or that have been given positive ratings by similar users. Interests can also be inferred, such as by identifying interests of other users who have similar characteristics.

The EaaS platform 230 may include an assembly layer 234, and an experience generator 236. The assembly layer 234 may be used to assemble an experience, such as by assembling various components that comprise the experience, such as content (such as messaging and communications, recommendations, and the like, including multimedia content, branded content, logos, and the like that may present aspects of the experience), entitlements (such as tickets, reservations, coupons, discounts, passes (including line skipping passes) and the like, as well as bar codes, QR codes, or other information needed to redeem an entitlement or undertake an experience), information about goods and services (such as packages of foods and beverages that can be ready for the visitor upon arrival), itinerary information (such as indicating time and place for the experience, wait time information, and the like), directional or navigation information, pricing information, and the like. The assembly layer 234 may include user interfaces for a human user to assemble an experience, such as by authoring messages, selecting elements of an experience (including by menus, by drag-and-drop interfaces that allow the user to pull items from libraries or database, and the like), setting parameters for the experience (such as pricing and discounts, timing factors (such as how long a discount is available), and the like. The assembly layer 234 may also include semi-automated, or entirely machine-based assembly of experiences. For example, a machine learning capability of the assembly layer may use a training set of assembled experiences as a basis for assembling (optionally under human supervision or with human confirmation) additional experiences that are similar to the ones created in the training set. Over time, the machine-based experience assembly capability may use feedback (such as based on metrics indicating satisfaction by visitors with assembled experiences or indicating profitability or per-visitor yield for experiences) to improve the capacity of the assembly layer 234 to assembly highly effective experiences. The assembly layer 234 may also embody rules, such from a rules engine 245, such as to mandate certain aspects of assembly of experiences or to preclude certain aspects of the assembly; for example, a rule might indicate that "no experience for a minor should include alcoholic beverages" or "all experiences between noon and 2:00 p.m. should include food and beverage recommendations." Thus, through a combination of human creation, machine-automation and application of rules, the assembly layer 234 allows the assembly of an experience. The experience generator 236 may take the experience assembled by the assembly layer 234 and generate a data structure reflecting the actual experience, such as generating a message, with appropriate codes for redemption, entitlements, and the like, for delivery such as to the visitor's mobile device or wearable device, and/or for delivery to a point of sale, such as for use by staff of the host.

The EaaS platform 230 can also include or connect to a physical world content management system 238, which may be used to manage various content that is used to design, create, assemble, deliver, and recommend experiences, such as multimedia content from various content libraries (e.g., branded content about products and services, attractions and the like, video content about experiences, map content, content about points of interest (including location data, opening hours, mapping of infrastructure elements, such as beacons and displays, etc.)), as well as information about visitors (such as user profile information as discussed in more detail below), information about other factors that can impact an experience (such as weather information), information about a venue (such as about available infrastructure, inventory, and the like), information about the host, information about parameters of experiences (such as pricing, discounts, inventory levels, wait times, restrictions, prohibitions, and the like), and many other types of content. The physical world content management system 238 is described in more detail elsewhere in this disclosure. The EaaS platform 230 may also include a recommendation engine 240 for recommending experiences or points of interest (POI) or aspects of experiences, either directly to a visitor or to personnel of a host, such as to assist in assembling experiences or to assist staff in guiding visitors to favorable experiences. The recommendation engine 240 is also described in more detail elsewhere in this disclosure. The EaaS platform 230 may also create, manage, and consume information from various user profiles/identities 242, each of which may contain various identity, demographic, psychographic, geographic, historical, transactional, relational, social, personality, or other information that may indicate a user's likely preferences, relationships (such as membership in a family social group, business group, or other group), or the like. In the context herein, the term "user" may refer to a venue attendee or a user of a particular mobile/wearable device 110 and/or front-end device 135. The EaaS platform 230 can further include, connect to, or integrate with a context engine 243, which may be used to determine the context of a visitor at a given time and place, such as taking into account the visitor's identity, the time of day, the season, the weather, the presence or proximity of various physical world elements (such as points of interest, displays, and infrastructure elements), the presence or proximity of other individuals (such as members of a family or social group, or the like), the visitor's history (such as recent activities or transactions, or longer-term activities that may indicate an interest in a type of activity), a visitor's current state (such as a level of energy or fatigue such as indicated by past activity (such as participation in physical exertion during hot weather)) or by tracking (such as by a wearable activity monitor) or a current mood (such as indicated by user survey), or by an indicator (such as from a physiological monitor or facial recognition facility), or the like, or any of a wide variety of other elements that reflect the state or context of the visitor. The context engine 243 may include automated elements, such as a machine learning facility, for automatically determining, or predicting, a user's context, which may optionally be trained via a human-generated training set and optimized based on feedback, such as indicators of the actual context of a visitor or indicators of particular factors used to determine that context. For example, visitors might provide feedback about energy levels, mood, or interest that may be used to refine machine-learning models that infer such factors based on other factors, such as time of day, weather, the consumption foods, and the like. Output from the context engine 243 may be provided to other aspects of the EaaS platform 230, such as the assembly layer, the experience generator, the SDK, the development application, and the like, so that experiences can be created that are appropriate for the context of a particular visitor or group.

The EaaS platform 230 may also include a sales activation engine 244, which may be used to assist personnel of the host in activating sales of goods and services that may be offered as part of or in conjunction with an experience. The sales activation engine 244 may take data from, for example, an inventory system, so that a user of the sales activation engine 244 may be aware of what goods and services are in stock and at what levels, which goods and services need to be promoted (to maintain appropriate inventory levels), which ones are most complementary to each other and to particular experiences or aspects of experiences, which ones are most profitable, and the like. A dashboard or interface of the sales activation engine 244 may allow personnel to determine what items should be promoted given the current context of a visitor, including the identity information, location, time of day, and other information and may suggest assembly of an overall experience that is most likely to promote sales (and a high yield or profit). For example, a person who has just waited in a long line on a hot day to participate in a thrill ride may be offered a discounted favorite cold beverage (such as based on past beverage purposes) at nearby point of interest, packaged with a recommendation for an experience that takes place there in an air conditioned environment. Embodiments of the sales activation engine 244 may include automation, including machine learning, to automate the recommendation or assembly of items for sale, such as by using a training set that is created by human personnel and subsequently optimized based on feedback metrics, such as metrics on actual sales of goods and services, metrics on profitability, and the like. Rules from the rules engine 245 may be used to govern the use of the sales activation engine 244, such as rules prohibiting certain types of sales activation (e.g., "do not run more than 5 sales promotions per visitor per day" or "promote item X to all visitors today"). Output from the sales activation engine 244 may include direct messages to visitors promoting items, as well as content for the assembly layer 234, such as content indicating what goods or services should be packaged or promoted with a recommended experience.

As noted, the EaaS platform 230 may make use of rules, including business rules, in various components and methods described throughout this disclosure. Rules, such as business rules, may be developed, maintained and distributed using the rules engine 245. Rules may be used to govern human-performed activities, such as ones used in various interfaces and dashboards to create, recommend, assemble, deliver and manage experiences, as well as to govern automated activities, such as similar ones performed based on machine learning.

The EaaS platform 230 can also connect to a beacon system 246, which may be associated with a location database 248, such that locations of beacons 246 at various points of interest in a location can be known to the EaaS platform 230, such as for use by humans, by machine-based automation or combination, as a basis for knowing where points of interest are and where other items (including detected items, such mobile devices, wearable devices, and the like) are relative to the points of interest. The location database 248 may include locations of beacons, points of interest, inventory items, infrastructure elements (including communications infrastructure, media infrastructure, display infrastructure, facilities and the like), and the like. The location database 248 may include source information for use by various layers of the dynamic venue map as described in detail elsewhere in this disclosure.

The EaaS platform 230 may also include the EaaS SDK 250, which may comprise a set of software tools, components, modules, libraries, and the like for using the various aspects of the EaaS platform 230, such as for taking outputs from and providing inputs to the context engine, the rules engine, the location database, the assembly layer, the experience generator, the recommendation engine, and other elements. This may include various interfaces and similar elements for connecting to the EaaS platform 230 and its components, including APIs, connectors, gateways, buses, bridges, message brokers, hubs and the like. The SDK may be used to create, assemble, deliver, and manage experiences, as well as to manage and use aspects of the EaaS platform 230.

The EaaS platform 230 can connect to and use the itineraries 228, such as to provide experiences to be included in an itinerary and to take itinerary information as an input, such as to determine a next message to provide to a user. Itineraries 228 are described in more detail elsewhere in this disclosure.

The EaaS platform 230 may interact with a mobile device 220 of a visitor or personnel of a host, such as for delivering messages and other content, delivering entitlements, redeeming entitlements, tracking user location, delivering sponsored content, and the like.

The EaaS platform 230 may use and integrate the dynamic venue map 202, such as presenting the map on a user device to show the venue, to guide visitors to experiences, to show content about points of interest, to show offers or promotions, to show sponsored content, or the like. The dynamic venue map 202 may also be used as an interface for experience developers, such as using the SDK or the development application, where staff of a host may see where a visitor is located, see nearby points of interest, see inventory levels and the like, to help a staff member determine an experience to recommend or provide information to a visitor about an available experience. The dynamic venue map 202 may also be used for analytics, such as showing reports on various metrics that are associated with points of interest at a location such as numbers of visits, sales levels, yields per visitor, inventory levels, profitability, and many others.

The EaaS platform 230 can also connect to the location systems infrastructure 204, such as to obtain current location data, such as the number of visitors detected in proximity to points of interest, and the like. An analytics API 256 of the EaaS platform 230 may provide access to various data from any of the components of the platform 230 for purposes of analytics, including the analytics facility described elsewhere in this disclosure and third party analytics facilities that may use the API to obtain information from the EaaS platform 230. The EaaS platform 230 may include a user interface, such as a corporate viewer user interface (UI) 254, which may comprise a user interface by which staff, such as executive staff of a host, may see data about various aspects of the EaaS platform 230, including metrics on experiences, visitors, visits, yields, and the like.

In embodiments, the analytics API 256 can connect to the EaaS platform 230. The analytics API 256 can also connect to the EaaS Platform 230 through the reporting and analytics facility 232. The corporate viewer UI 254 can connect to the EaaS platform 230. In further aspects, the corporate viewer UI 254 can connect to the EaaS Platform 230 and make use of the reporting and analytics module 232.

Recommendations can also include coupons and promotions, sponsored content, and the like. Available experiences can be delivered by optional push notifications or can be made available to be pulled, such as by interactions with a dynamic venue map 202, by searching (such as using a mobile device), or the like. Recommendations can be sent by server 125 to a staff member or to the guest. Recommendations can be integrated into a personalized itinerary before being sent by server 125 to a staff member or to the guest, the personalized itinerary optionally including other experiences or POIs besides the experiences or POIs recommended by the EaaS platform 230. Recommendations may also be based on similarity or dissimilarity to other experiences or POIs in the personalized itinerary, such as experiences or POIs that were personally selected by the user to whom the itinerary is personalized.

Figure 3:
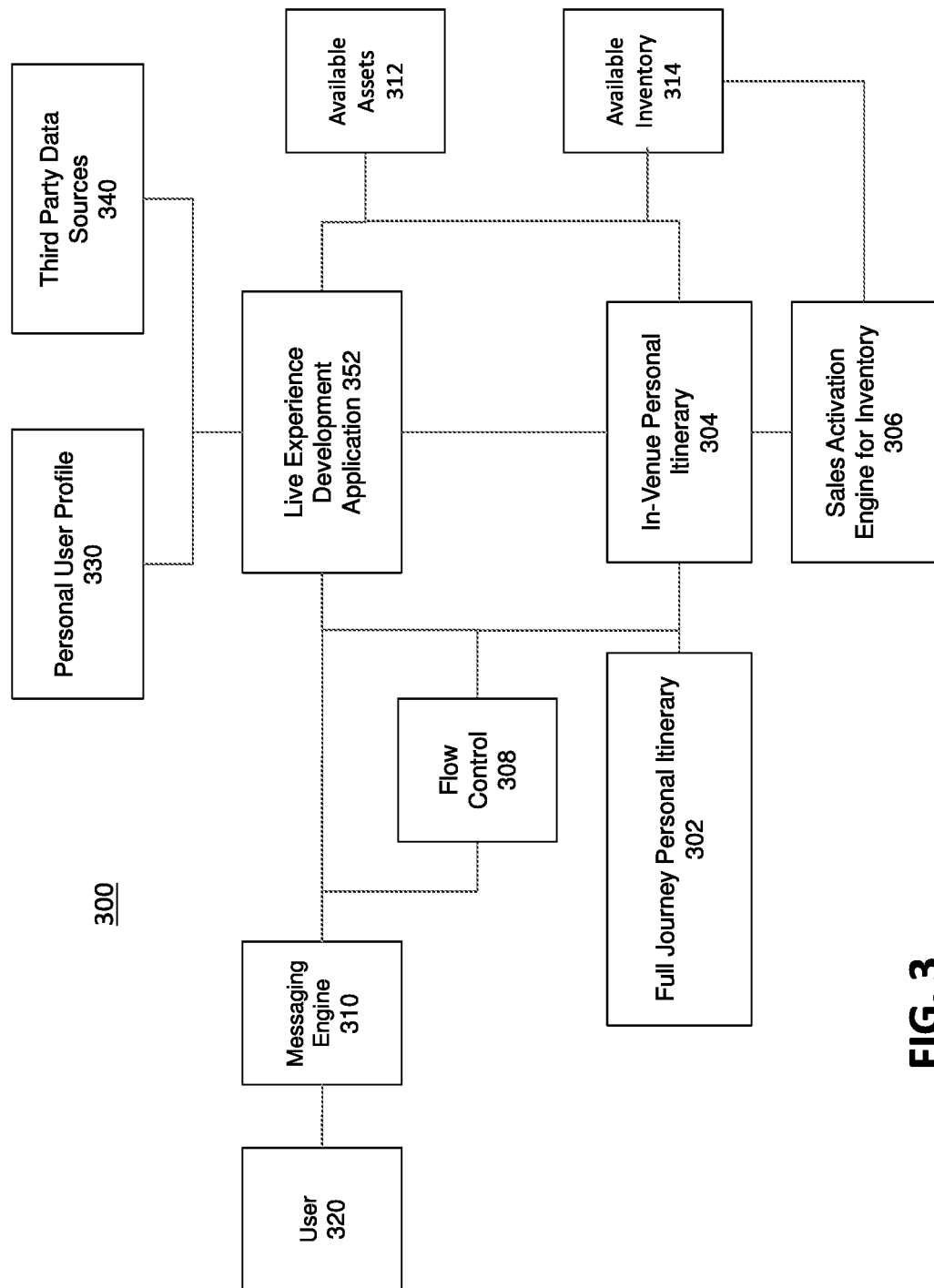
FIG. 3 illustrates information flow for real-time management of experiences and personalized itineraries.

FIG. 3 illustrates information flow for real-time management of experiences and personalized itineraries. The information flow 300 of FIG. 3 more specifically shows connections (each optionally bidirectional) between different types and/or sources of information that ultimately are used to produce a personalized itinerary 302/304 for a user 320. In relation to FIG. 1, any of the sources of information 140 discussed with respect to FIG. 3 may be among any of data source(s) 105 identified in FIG. 1 and/or may be stored at the app server(s) 125 itself.

The EaaS platform 130, in the context of FIG. 3, can create and manage an itinerary 302/304 for a user. The itinerary 302 can be for a full journey for a user within a venue, such as from a point of origin (e.g., at home), to one or more locations/areas/venues (such as to a series of cities on a trip, a series of islands or ports on a cruise as in FIG. 5 or FIG. 6, or the like) and points of interest or sub-venues along the way (such as theme parks, ships, aircraft, ports, stores, malls, restaurants, bars, and many others). For each venue or sub-venue, an in-venue itinerary 304 can be generated, which in examples can be a highly personalized personal itinerary 304 that is generated based on the user profile 330 that may identify likes and dislikes and location histories of a user 320, as well as based on other information, such as from various third party data sources 340, which can include information about entitlements (such as tickets the user can have already obtained to particular attractions or events, reservations the user can have already made, and the like), information about expressed preferences, interests, or plans, information about climate and weather, and many other items. Third party data sources 340 may include social media profiles corresponding to users/attendees 320. Third party data sources 340 may be part of the personal user profile 330, though they are illustrated separately in FIG. 3.

In examples, a live experience development application 352 can be used to generate an in-venue personal itinerary 304 for the part of the itinerary 302 that is associated with a visit to a particular venue. In addition to using the user profile information 330 (which, as noted in this disclosure, can account for relationships and connections with a group, such that an itinerary for a user can be associated with, and managed in connection with, a larger group itinerary) and other information about the full journey itinerary 302, the in-venue personal itinerary 304 can be dynamically created and account for other factors, such as current wait times and crowds (including adjusting the itinerary 304 for flow control 308, so that users within a venue are spread smoothly across attractions, while still satisfying personal needs and goals).

The itinerary 304 can also be repeatedly updated based on available assets 312 (such as what attractions are open and have reasonable wait times in the proximity of the user at a given time), the user's current state (such as whether the user expresses hunger, thirst, fatigue, or the like, or such factors are inferred based on history), information about the user's group (such as locations and itineraries of the group), recommendations for the user (such as described in connection with the recommendation engine, including appropriate recommendations for the immediate time and location as well as recommendations for later experiences. The itineraries 302 and 304 can be delivered and updated by the messaging engine 310, such as by text or voice messages to the user's mobile phone or wearable device, as well as by presentation of information on the live, branded, dynamic venue map. For example, an itinerary can be shown on a map with the current location and currently recommended item highlighted (such as in a color, with flashing symbols, or the like), and one or more alternative future recommendations shown, with routing information (including alternative available routes and itineraries) for the user.

The itinerary can show optional items as well as mandatory items (such as the designated meetup location for a group). The EaaS platform 130, such as using the live experience development application 352 or automatically, such as by machine learning, can constantly update the itinerary, such as accounting for changes. Changes can include the user having more time, because an attraction took less time than expected, or vice versa, or the user deciding to take a different route or do something different than was previously anticipated in the itinerary 306. Changes can include changes in the inventory of tickets, goods, services, or the like near the user's location or at other locations that are later in the itinerary. Changes can include changes in wait times. Changes can include changes in the user's state, such as becoming tired, hungry, thirsty, or bored. Changes can include changes in itineraries for the user's group, changes in locations for members of the group, or the like. In each case, updated information can be used to suggest a new itinerary that accounts for the current state of the user and the venue.

In many aspects, the EaaS platform 130 can track completion of experiences for an itinerary, such as by receiving location signals (such as an indication that a user's mobile phone or wearable device has entered the proximity of a beacon that is positioned at a point of interest), by receiving evidence of redemption of entitlements (such as redemption of tickets, including electronic tickets, or redemption of credits, such as stored on a mobile device or wearable), and receiving evidence of purchases or consumption (such as indicated by transaction data or other information from points of purchase located within a venue). Completed experiences can be recorded on the itinerary, prompting directions (such as messages or elements on a map, such as routing information) for the next itinerary item, allowing the progression through a series of locations, points of interest and the like on the itinerary. As noted, changes in the venue, in the user's state, and other factors can lead to changes in the itinerary, which can be managed automatically in the platform, can be managed by the user (such as by setting or approving items on the user's mobile phone), and can be managed for the user by the experience provider, such as using the live experience development application 352.

In an example, a father and son are visiting a theme park. The live experience development application 352 is used to generate a full journey personal itinerary 302 for the father to follow during the visit. The full journey personal itinerary 302 includes recommendations based on the personal user profiles 330 of the father and of the son.

For example, the personal user profiles 330 of the father and of the son indicate the father-son relationship. The personal user profile 330 of the son indicates the son prefers to ride roller coasters, ride Ferris wheels and eat pizza. The personal user profile 330 of the father indicates the father has no ride preferences and prefers healthy eating options.

The full journey personal itinerary 302 is also developed using data from third party data sources 340. For example, the father would like to minimize the cost of the trip and asked a question on a social network about how to minimize costs during a trip to a theme park. This question is used to signal to the live experience development application 352 to include special deals and offers in the full journey personal itinerary 302. Such information may alternately be included in the father's user profile.

When in a group, all of this information concerning both the father and the son may be used to generate recommendations for experiences and/or points of interest (POIs). For example, the son's preference for pizza and the father's preference for healthy eating options may result in a recommendation for a restaurant that provides both pizza and healthy eating options. The son's preference for roller coasters and ferris wheels combined with the father's preference for minimizing costs of the trip may result in a recommendation for the lowest-cost roller coaster or ferris wheel rides. This may be combined with locations of the father and son so as to recommend POIs that are near both the father and the son or along a route that they are known to be using based on other POIs (such as self-selected POIs) in their group itinerary or separate respective itineraries.

Figure 4:
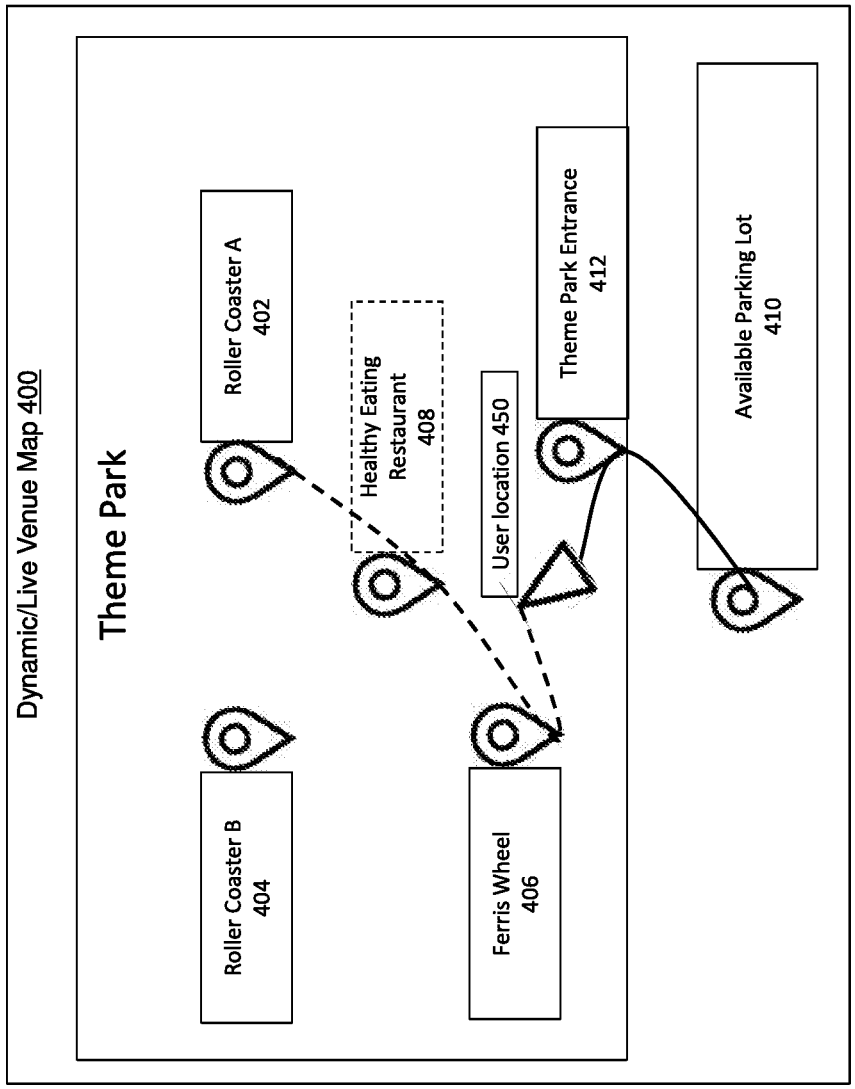
FIG. 4 illustrates a dynamic live venue map identifying a personalized itinerary in a theme park venue.

FIG. 4 illustrates a dynamic live venue map identifying a personalized itinerary in a theme park venue. The dynamic live venue map 400 of FIG. 4 may be one implementation of a dynamic venue map 202 as discussed with respect to FIG. 2 and/or a personalized itinerary 302/304 as discussed with respect to FIG. 3.

Available assets 312 in the context of FIG. 4 indicate there are two roller coasters (roller coaster A 402 and roller coaster B 404), a Ferris wheel 406, a healthy eating restaurant 408, a theme park entrance 412, and a parking lot 410 available at the theme park. The user's location 450 is marked on the map, with a solid line indicating that the user has traveled from the parking lot 410 to the theme park entrance 412 and is now standing between the theme park entrance 412 and the Ferris wheel 406. The Ferris wheel 406, the healthy eating restaurant 408 (optionally if the user is hungry as marked using a dashed box), and the Roller coaster A 402 are included on the full journey personal itinerary 302 of FIG. 4. Available inventory 314 indicates the ingredients for salads at a healthy eating restaurant 408 are nearing the end of their shelf life, and this inventory information can be a component in recommending or not recommending the healthy eating restaurant 408. The healthy eating restaurant 408 is also included on the full journey personal itinerary 302 of FIG. 4 for at least this reason.

Presentation layer development can include the use of a dynamic/live venue map 400. The dynamic/live venue map 400 can include point of interest (POI) locations 404, 402, 406, 408, 410, 412, which can be dynamically updated based on changes occurring within a venue or managed location. In many aspects, wait time can be an example of point of interest data or metadata associated with a location or point on the dynamic map. By way of this example, the point of interest data or map point metadata for one or more destinations can be pulled and updated among the users. In these examples, the point of interest data or map point metadata can include menu data for the restaurant, wait times for many points of interest at a managed location, or the like.

The personalized itinerary map of FIG. 4 may include recommendations for and based on two users, to relate FIG. 4 back to the father/son example discussed with respect to FIG. 3. The full journey personal itinerary 302 is sent prior to the visit via the messaging engine 310 to the visitor device/wearable 110 of the father, which is acting as a front-end device 135 in the context of FIG. 1. The full journey personal itinerary 302 can stretch back before arrival at the venue (the theme park) to also include directions to the theme park from the father's and son's home, as well as parking information. Parking information is updated based on the available inventory 314 of parking. This guides the father and son to an available parking lot 410, minimizing time they have to spend searching for an available parking space.

The EaaS platform 130 detects when the father and son enter the theme park, by detecting that a beacon on the mobile phone of the father has entered the boundaries of the theme park. An in-venue personal itinerary 304 is sent to the mobile phone of the father when the EaaS platform 130 detects the father and son have entered the theme park.

The in-venue personal itinerary 304 includes a dynamic/live venue map 400. In this example, roller coaster A 402, roller coaster B 404, Ferris wheel 406 and healthy eating restaurant 408 are displayed as POI locations on the dynamic/live venue map 400.

The in-venue personal itinerary 304 suggests that the father and son ride roller coaster A 402 first, since roller coaster A is located close to the theme park entrance 412. Because it is before noon, the in-venue personal itinerary 304 suggests the father and son ride roller coaster B 404 second, before having lunch.

After riding roller coaster A 402, the father indicates in his user state (which may be part of the user profile information) that the father and son are hungry. Alternately, the EaaS platform may deduce that the father and son are likely hungry based on a time since they were last at a food establishment exceeding a predetermined amount of time (e.g, 3 hours). Based on this indication, a healthy eating restaurant 408 located in close proximity to the exit of Ferris Wheel 406 is displayed as a dynamic map location 408 on dynamic/live venue map 400.

The healthy eating restaurant 408 also serves salads. Because the ingredients used to make salads are near the end of their shelf life, a buy-one-get-one-free salad offer is generated. Healthy eating restaurant 408 is then highlighted on the dynamic/live venue map 400, indicating a deal on salads is available. The father chooses the healthy eating restaurant 408 for him and his son to have lunch and orders salads for both of them, redeeming the buy-one-get-one-free salad offer.

In one example, the father and son may have had plans to ride roller coaster B 404 after lunch. The EaaS platform 130 used wait time data or queue length data from information 140 (as discussed with respect to FIG. 1) to detect that wait time at the Roller Coaster A 402 was short (or zero), while wait time at roller coaster B 404 was significant (e.g., exceeding a predetermined duration of time), indicating a shorter line at the Roller Coaster A 402 than at the Roller Coaster B 404, as the father and son were finishing lunch. As the father and son were finishing lunch, the dynamic map location of the Roller Coaster A 402 on the dynamic/live venue map 400 turned green, indicating there was no line at the Roller Coaster A 402. Since there was no line at the Ferris wheel 406, the father and son decided to ride the Roller Coaster A 402 after lunch, rather than ride roller coaster B 404.

With reference to FIG. 2, the present teachings generally include real time management of highly personalized experiences of customers, their families, traveling companions or the like. The real time management of highly personalized experiences at managed locations can be integrated into many of the operations and offerings at the managed locations. The operations and offerings at the managed locations can include events and entertainment offerings, but also includes fare offered by the location, and transport to and from the managed locations. With regard to transport to and from the managed locations, the real time management of highly personalized experiences of customers can coordinate the managed location to guide patrons to proper surface parking, garages, parking trams, or other forms of transportation that can be used.

The real time management of highly personalized experiences of customers can connect to the computing devices of the customers and their family members, as well as computing devices of the host and its personnel, including staff at the venue and personal located remote from the venue. The computing devices can include phones, tablets, watches, wearable devices (including ones dedicated to use at the venue), augmented reality or virtual reality glasses, as well as laptop and desktop computers, servers, and the like. In connecting to the computing devices of customers, cellular network and cloud network facilities can be employed to ensure interconnection. The real time management of highly personalized experiences of customers can also connect with sponsors (such as advertisers) so as to be able to provide sponsored content to the customers at the managed locations. The sponsored content can be related in real-time to what is occurring with the user and/or the family of the user, their itinerary, the time of day and many factors relating to placement of sponsored content.

Figure 5:
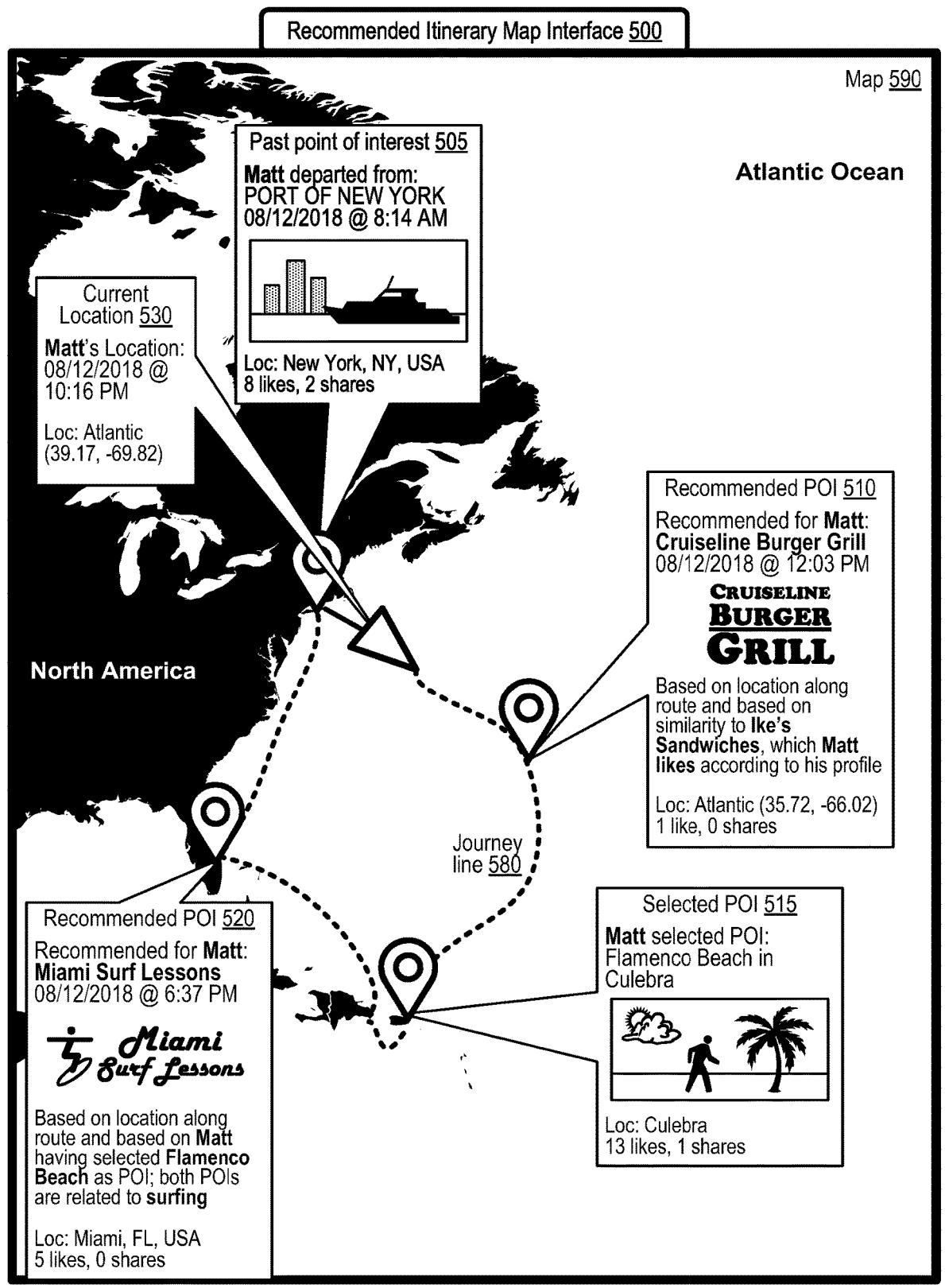
FIG. 5 illustrates a recommended itinerary map interface for a single user.

FIG. 5 illustrates a recommended itinerary map interface for a single user. The recommended itinerary map interface 500 of FIG. 5 may be one implementation of a dynamic venue map 202 as discussed with respect to FIG. 2 and/or a personalized itinerary 302/304 as discussed with respect to FIG. 3. In particular, the recommended itinerary map interface 500 of FIG. 5 maps a personalized itinerary including recommended POIs and user-selected POIs for a user "Matt" within a map 590 of a venue selected to be Eastern North America.

The recommended itinerary map interface 500 of FIG. 5 identifies a past POI 505 as the port of New York, which the user "Matt" was at previously. A first recommended POI 510 is provided by the EaaS platform 230 as "Cruiseline Burger Grill." The recommended POI 510 is recommended based on its location being along an existing route (from the user's current location 530 to selected POI 515) and based on similarity to something that the user "Matt" likes according to his user profile ("Ike's Sadwiches"). A second POI 515 along the personalized itinerary is user-selected—Flamenco Beach in Culebra. A third POI 520 along the personalized itinerary is recommended by the EaaS platform 230 as "Miami Surf Lessons" based on its location being along an existing route (from the user-selected POI 515 back to the port of New York 505) and based on similarity to the user-selected POI 515 (Flamenco Beach in Culebra) in that both POIs are related to surfing.

The resulting map interface 500 illustrates a journey line 580 representing a path connecting the POIs 505, 510, 515, 520, and back to 505, the journey line 580 also connecting the current location 530 of the user. In some cases, a path 580 may be somewhat pre-set, as in a pre-set cruise, in which case recommended POIs may be recommended because they are along that path 580 and one or more additional reasons, such as similarity to "likes" of the user or dissimilarity to "dislikes" of the user or any of the other reasons identified above.

Figure 6:
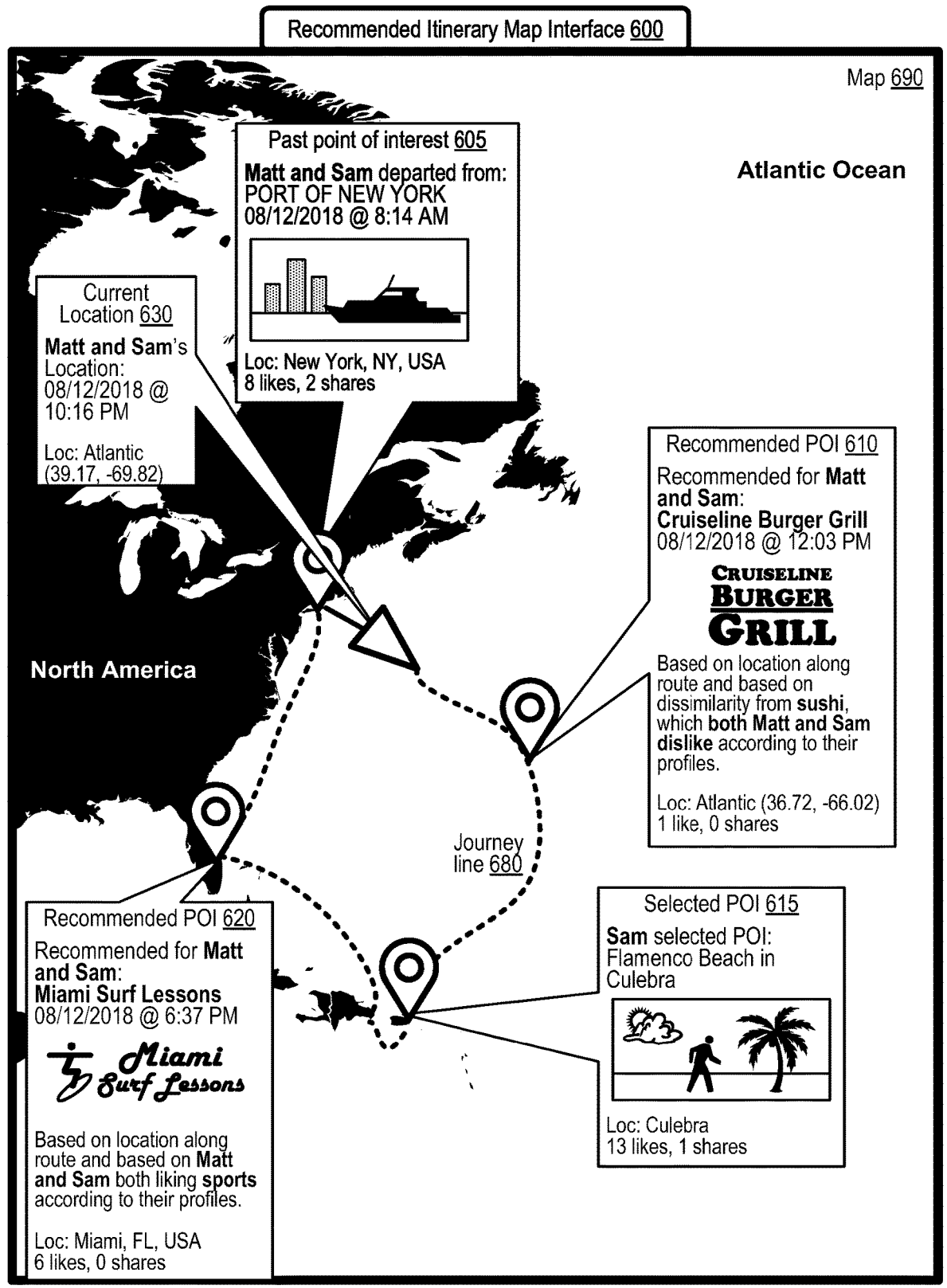
FIG. 6 illustrates a recommended itinerary map interface for two users.

FIG. 6 illustrates a recommended itinerary map interface for two users. The recommended itinerary map interface 600 of FIG. 6 may be one implementation of a dynamic venue map 202 as discussed with respect to FIG. 2 and/or a personalized itinerary 302/304 as discussed with respect to FIG. 3. In particular, the recommended itinerary map interface 600 of FIG. 6 maps a personalized itinerary including recommended POIs and user-selected POIs for two users "Matt" and "Sam" within a map 690 of a venue selected to be Eastern North America.

The recommended itinerary map interface 600 of FIG. 6 identifies a past POI 605 as the port of New York, which the users "Matt" and "Sam" were both at previously. A first recommended POI 610 is provided by the EaaS platform 230 as "Cruiseline Burger Grill." The recommended POI 610 is recommended based on its location being along an existing route (from the current location of both users 630 to selected POI 615) and based on dissimilarity to something that both users ("Matt" and "Sam") dislike according to their respective user profiles (sushi). A second POI 615 along the personalized itinerary is user-selected—Flamenco Beach in Culebra. A third POI 620 along the personalized itinerary is recommended by the EaaS platform 230 as "Miami Surf Lessons" based on its location being along an existing route (from the user-selected POI 615 back to the port of New York 605) and based on similarity to something that both users ("Matt" and "Sam") like according to their respective user profiles (sports).

While the recommended itinerary map interfaces 400, 500, 600, and 1000 of FIG. 4, FIG. 5, FIG. 6, and FIG. 10 respectively, are all maps, it should be understood that a personalized itinerary can take the form of a list of POIs, either in order of when they should be visited or in a different order.

The resulting map interface 600 illustrates a journey line 680 representing a path connecting the POIs 605, 610, 615, 620, and back to 605, the journey line 680 also connecting the current location 630 of the users. In some cases, a path 680 may be somewhat pre-set, as in a pre-set cruise, in which case recommended POIs may be recommended because they are along that path 680 and one or more additional reasons, such as similarity to "likes" of one or more of the users or dissimilarity to "dislikes" of one or more of the users or any of the other reasons identified above.

Figure 7:
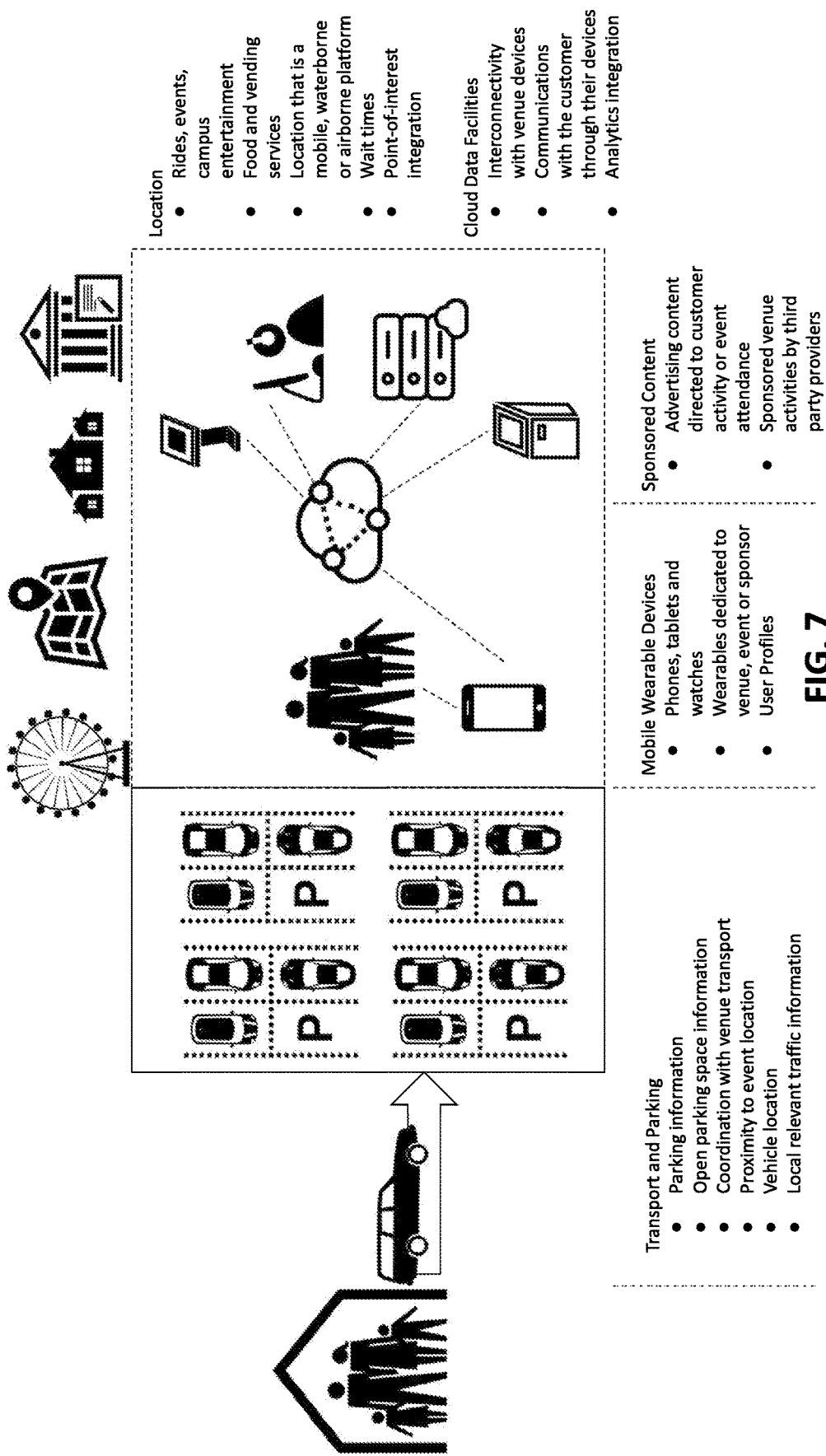
FIG. 7 illustrates delivery of itinerary personalization to users.

FIG. 7 illustrates delivery of itinerary personalization to users.

With reference to FIG. 7, the present teachings generally include real time management of highly personalized experiences of customers, their families, traveling companions or the like. The real time management of highly personalized experiences at managed locations can be integrated into many of the operations and offerings at the managed locations. The operations and offerings at the managed locations can include events and entertainment offerings, but also includes fare offered by the location, and transport to and from the managed locations. With regard to transport to and from the managed locations, the real time management of highly personalized experiences of customers can coordinate the managed location to guide patrons to proper surface parking, garages, parking trams, or other forms of transportation that can be used.

The real time management of highly personalized experiences of customers can connect to the computing devices of the customers and their family members, as well as computing devices of the host and its personnel, including staff at the venue and personal located remote from the venue. The computing devices can include phones, tablets, watches, wearable devices (including ones dedicated to use at the venue), augmented reality or virtual reality glasses, as well as laptop and desktop computers, servers, and the like. In connecting to the computing devices of customers, cellular network and cloud network facilities can be employed to ensure interconnection. The real time management of highly personalized experiences of customers can also connect with sponsors (such as advertisers) so as to be able to provide sponsored content to the customers at the managed locations. The sponsored content can be related in real-time to what is occurring with the user and/or the family of the user, their itinerary, the time of day and many factors relating to placement of sponsored content.

In short, the personalized itineraries 302/304 or maps 202 discussed herein may include recommended POIs based on any of the information discussed in FIG. 7, including for example information concerning transportation method, availability of rides using different transportation methods, scheduled events, campus entertainment, food and vending services inventory, location, wait times, parking locations and availability, open parking space information, coordination with venue transport, proximity to event location, vehicle and/or user and/or mobile device location, local relevant traffic information, advertising content directed to customer or activity or event, sponsored POIs.

Figure 8:
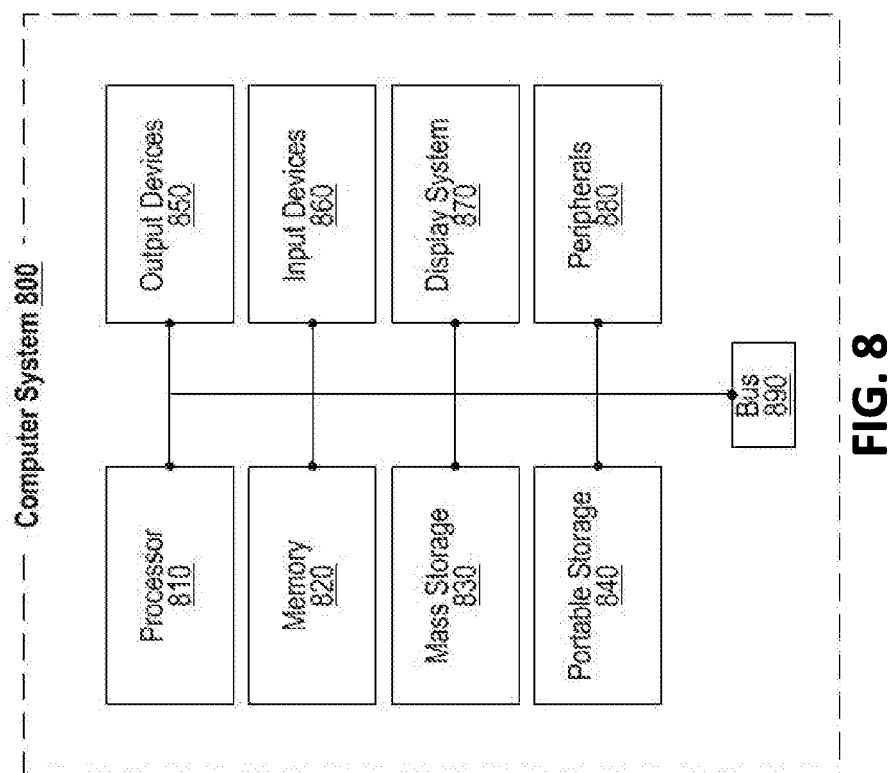
FIG. 8 is a block diagram of an exemplary computing device that may be used to implement the present systems.

FIG. 8 illustrates an exemplary computing system 800 that may be used to implement some aspects of the subject technology. For example, any of the computing devices, computing systems, network devices, network systems, servers, and/or arrangements of circuitry described herein may include at least one computing system 800, or may include at least one component of the computer system 800 identified in FIG. 8. The computing system 800 of FIG. 8 includes one or more processors 810 and memory 820. Each of the processor(s) 810 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 810 may include one or more cores, either integrated onto a single chip or spread across multiple chips connected or coupled together. Memory 820 stores, in part, instructions and data for execution by processor 810. Memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing some aspects of the subject technology for purposes of loading that software into memory 820.

Portable storage device 840 operates in conjunction with a portable non-volatile storage medium, such as a floppy disk, compact disk or Digital video disc, to input and output data and code to and from the computer system 800 of FIG. 8. The system software for implementing aspects of the subject technology may be stored on such a portable medium and input to the computer system 800 via the portable storage device 840.

The memory 820, mass storage device 830, or portable storage 840 may in some cases store sensitive information, such as transaction information, health information, or cryptographic keys, and may in some cases encrypt or decrypt such information with the aid of the processor 810. The memory 820, mass storage device 830, or portable storage 840 may in some cases store, at least in part, instructions, executable code, or other data for execution or processing by the processor 810.

Output devices 850 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 870. The printer may be inkjet, laserjet, thermal, or some combination thereof. In some cases, the output device circuitry 850 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 850 may include any ports, plugs, antennae, wired or wireless transmitters, wired or wireless transceivers, or any other components necessary for or usable to implement the communication types listed above, such as cellular Subscriber Identity Module (SIM) cards.

Input devices 860 may include circuitry providing a portion of a user interface. Input devices 860 may include an alpha-numeric keypad, such as a keyboard, for inputting alpha-numeric and other information, or a pointing device, such as a mouse, a trackball, stylus, or cursor direction keys. Input devices 860 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 860 may include any ports, plugs, antennae, wired or wireless receivers, wired or wireless transceivers, or any other components necessary for or usable to implement the communication types listed above, such as cellular SIM cards.

Display system 870 may include a liquid crystal display (LCD), a plasma display, an organic light-emitting diode (OLED) display, an electronic ink or "e-paper" display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 800 of FIG. 8 are those typically found in computer systems that may be suitable for use with some aspects of the subject technology and are intended to represent a broad category of such computer components that are well known in the art. Thus, the computer system 800 of FIG. 8 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 800 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 820, the mass storage 830, the portable storage 840, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay®/Mastercard®/Visa® (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L8), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 810 for execution. A bus 890 carries the data to system RAM or another memory 820, from which a processor 810 retrieves and executes the instructions. The instructions received by system RAM or another memory 820 can optionally be stored on a fixed disk (mass storage device 830/portable storage 840) either before or after execution by processor 810. Various forms of storage may likewise be implemented as well as the necessary network interfaces and network topologies to implement the same.

Figure 9:
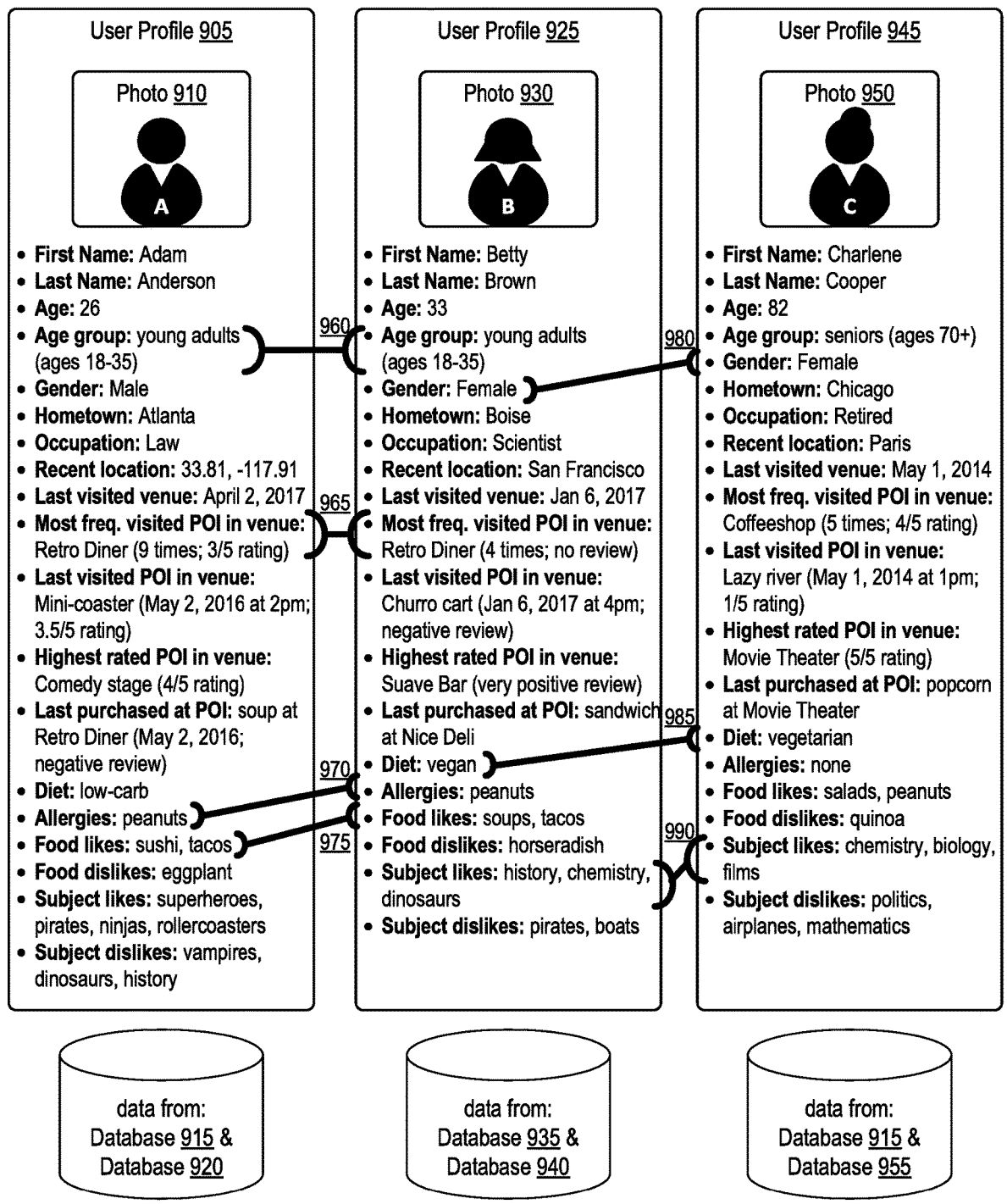
FIG. 9 illustrates identification of similar users based on shared traits.
Figure 10:
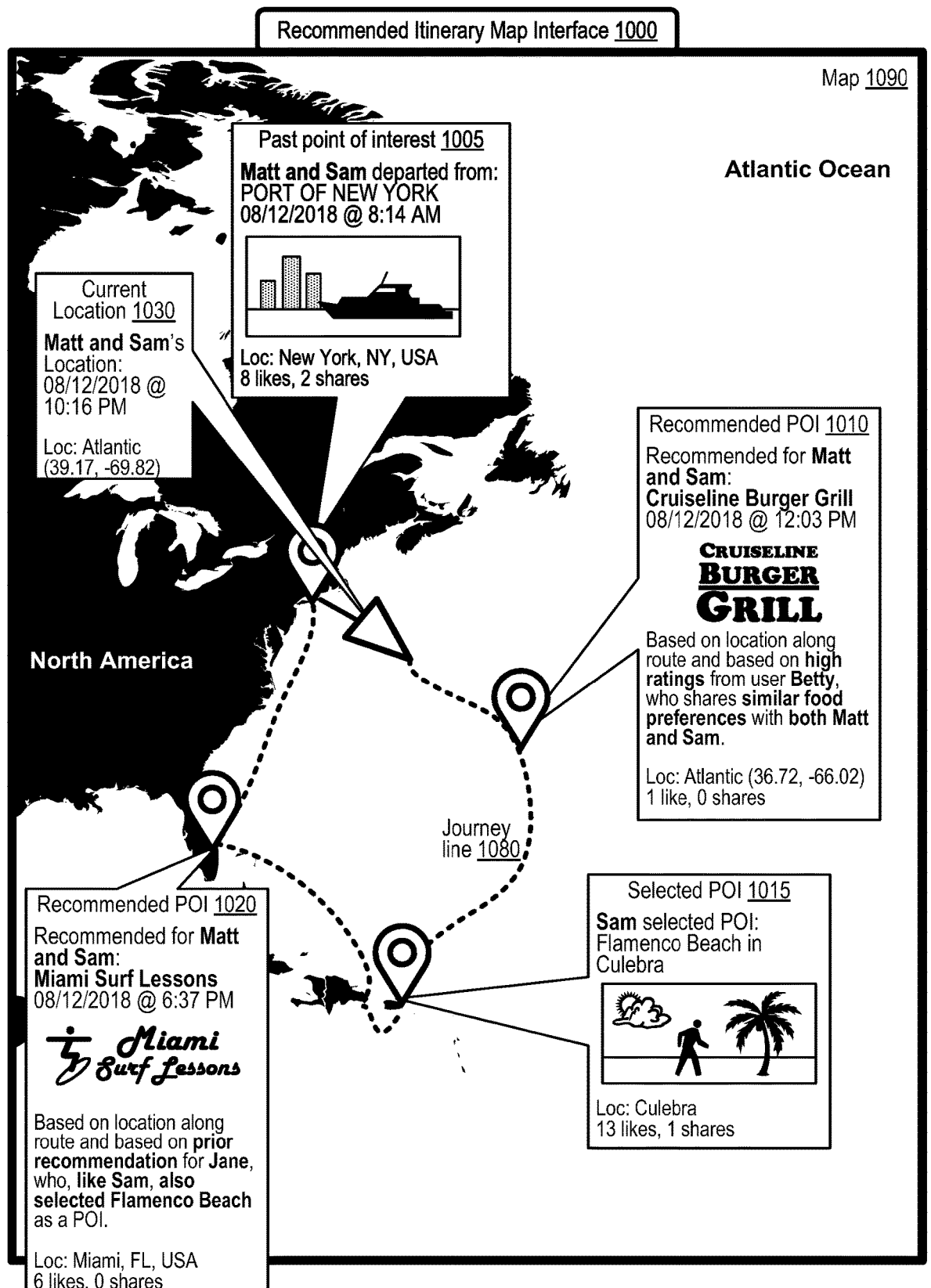
FIG. 10 illustrates a recommended itinerary map interface for two users in which certain recommendations are generated based on similarities to other users.

FIG. 9 illustrates identification of similar users based on shared traits. In the context of FIG. 9, FIG. 10, and otherwise herein, it should be understood that the term "user" may refer to venue attendees or venue guests, and the term "user profile" may be referred to as a "venue attendee profile" or a "venue guest profile."

Three user profiles are illustrated in FIG. 9—a first user profile 905 corresponding to a first venue attendee ("Adam Anderson") with an included photo 910 of the first venue attendee, a second user profile 925 corresponding to a second venue attendee ("Betty Brown") with an included photo 930 of the second venue attendee, and a third user profile 945 corresponding to a third venue attendee ("Charlene Cooper") with an included photo 950 of the third venue attendee.

Each user profile lists a number of traits about the corresponding venue attendee along with the photo 910/930/950. In FIG. 9, these each user profile lists the same traits about every venue attendee, but in other situations, different user profiles may list different types of traits, with some traits missing from certain user profiles and some additional traits listed in certain user profiles. In FIG. 9, the traits listed include first name, last name, age, age group, gender, hometown, occupation, recent location, the last time that the venue attendee has visited the venue, the venue attendee's most frequently visited point of interest (POI) in the venue area, the venue attendee's last (most recently) visited point of interest (POI) in the venue area, the venue attendee's most highly-rated point of interest (POI) in the venue area, the venue attendee's most recent purchase at a point of interest (POI) in the venue area, a diet that the venue attendee is following, any allergies that the venue attendee has, food that the venue attendee likes or prefers, food that the venue attendee dislikes or cannot eat, subjects that the venue attendee likes or prefers, and subjects that the venue attendee dislikes.

The app server(s) 125 or other computing devices 800 implementing the recommendation experience as a service (EaaS) platform 230 may retrieve the various data in each user profile—that is, the photos 910/930/950 and the various listed traits corresponding to each venue attendee—from various data sources, such as databases or other data structures in a local memory of the EaaS platform 230, databases or other data structures stored by network servers accessible via local area network (LAN) by the EaaS platform 230, databases or other data structures stored by remote servers accessible via the internet by the EaaS platform 230, or combinations thereof. These databases or other data structures may be associated with the venue itself, and at least some of the data included therein may for example be collected upon entry into the venue area and/or upon entry to certain POIs within the venue area. These databases or other data structures may be shared the EaaS platform 230 actively by the user or may be otherwise collected, retrieved, scraped, and/or parsed by the EaaS platform 230. These databases or other data structures may be associated with social media networks, such as Facebook®, LinkedIn®, Instagram®, Snapchat®, Youtube®, Pinterest®, or similar social media networks. These databases or other data structures may be associated with online dating platforms. These databases or other data structures may be associated with professional websites or job hunting websites. Different user profiles may be gathered from the same data sources or from different data sources. For example, in FIG. 9, user profile 905 is listed as comprising data from a database 915 and a database 920, user profile 925 is listed as comprising data from a database 935 and a database 940, and user profile 945 is listed as comprising data from the database 915 and a database 955.

The app server(s) 125 or other computing devices 800 implementing the experience as a service (EaaS) platform 230 can find similarities or dissimilarities between different venue attendees for use later with recommending POIs or personalizing itineraries as illustrated in and discussed with respect to FIG. 10. Finding of similar or dissimilar venue attendees is based on finding one or more shared traits that are common to two or more user profiles, such as the user profiles 905, 925, and 945 shown in FIG. 9.

For example, age group is a shared trait 960 common to user profile 905 and user profile 925, as both are in the age group "young adults (ages 18-35)." Most frequently visited point of interest (POI) in the venue area is another shared trait 965 common to user profile 905 and user profile 925, as both are listed as the POI "Retro Diner," which user Adam Anderson of user profile 905 has visited 9 times and given a 3/5 rating, and which user Betty Brown of user profile 25 has visited 4 times and provided no known review or rating. Allergies is another shared trait 970 common to user profile 905 and user profile 925, as both users are listed as allergic to peanuts. Food likes/preferences is another shared trait 975 common to user profile 905 and user profile 925, as both users are listed as enjoying/liking/preferring tacos. Thus, user profile 905 and user profile 925 as shown in FIG. 9 have at least four shared traits in common.

Gender is a shared trait 980 common to user profile 925 and user profile 945, as both users are female. Diet is another shared trait 985 common to user profile 925 and user profile 945, as one user is vegetarian and the other user is vegan— which the EaaS platform 230 may recognize as similar enough though they are not identical. Subject likes/preferences is another shared trait 990 common to user profile 925 and user profile 945, as they both enjoy/like/prefer chemistry. Thus, user profile 925 and user profile 945 as shown in FIG. 9 have at least three shared traits in common.

In situations where the EaaS platform 230 find multiple users to be similar to a particular user, the EaaS platform 230 may rank those multiple users based on how many shared traits are found in common between the user profiles corresponding to those users. For example, because user profile 905 and user profile 925 as shown in FIG. 9 have four shared traits in common while user profile 925 and user profile 945 as shown in FIG. 9 have only three shared traits in common, user Betty Brown associated with user profile 925 may be identified by the EaaS platform 230 as being more similar to user Adam Anderson associated with user profile 905 than to user Charlene Cooper associated with user profile 945.

Once the experience as a service (EaaS) platform 230 identifies that a first user is similar to a second user, it may generate a recommendation of a particular POI for the first user, and/or personalized itinerary including a recommendation for the particular POI for the first user, based on one or more indicator(s) of positivity associated with the particular POI and corresponding to the second user.

An indicator of positivity associated with a POI and corresponding to a user may be, for example, one or more ratings exceeding a predetermined threshold rating, one or more reviews that include phrases associated with positivity, selection by the user of the POI, recommendation of the POI to the user by the EaaS platform 230, or combinations thereof. Phrases associated with positivity in reviews may include phrases or phrases like "good," "great," "delicious," "amazing," "phenomenal," "incredible," translations of those phrases into other languages, and the like.

In some cases—especially those in which a similar user mostly or exclusively expresses indicators of negativity about various POIs—an indicator of positivity may be simply the lack of an indicator of negativity. Indicators of negativity may include, for example, one or more ratings below a predetermined threshold rating, one or more reviews that include phrases associated with negativity, avoidance by the user of the POI, or combinations thereof. Phrases associated with negativity in reviews may include phrases like "bad," "terrible," "awful," "horrible," "made me sick," "made us sick," "disgusting," "incredible," swear words, translations of those phrases into other languages, and the like. Where a review includes both phrases associated with positivity and negativity, a sum can be generated of the "value" of all of the phrases associated with positivity and negativity, where phrases associated with positivity are given a positive value (such as 1) and phrases associated with negativity are given a negative value (such as −1). If the sum is positive, the review can be treated as positive, and if the sum is negative, the review can be treated as negative.

It should be understood that the terms "user," "venue attendee" and "venue" guest can be used interchangeably at least with respect to FIG. 9 and FIG. 10, and that "venue attendee" or "venue guest" can refer to former venue attendees or venue guests—that is, persons who previously visited the venue area but are no longer located in the venue area. That is, the EaaS platform 230 can determine that a venue attendee that is currently at the venue is similar to a former venue attendee that visited the venue over a year ago, and generate a recommendation for a particular POI and/or personalized itinerary including a recommendation for the particular POI based on indicator(s) of positivity associated with the particular POI and corresponding to that former venue attendee.

In a "tie" situation where a particular user is equally similar to multiple similar users, the EaaS platform 230 can pick one of those multiple similar users at random and select the recommended POI based on an indicator of positivity associated with the POI that is then selected to be the recommended POI corresponding to that one picked similar user. Alternately, the EaaS platform 230 can use multiple of those multiple similar users by finding a POI for which multiple similar users all have indicators of positivity about the same POI, and selecting that POI to the recommended POI for the user to which they are similar.

Ranking can be made more complex than a simple count of shared traits in common between two profiles, however, to provide greater specificity and to limit "tie" situations. Certain shared traits can be weighted via a multiplier to be counted as more or less important than other shared traits. For example, shared allergies can be weighted to be more important than shared subject matter preferences, for example by having shared allergies count as 1.5 shared traits while shared subject matter preferences count as 1 shared trait or even 0.9 shared trait. Similarly, age group can be weighted to be more important than age or vice versa, and occupation can be weighted to be more important than hometown, or any other combination of weighting.

While not illustrated explicitly in FIG. 9, the EaaS platform 230 can also be used to find dissimilarities or explicit mismatches between users. These can be found, for example, where a "like" or "preference" for one user is identified as a "dislike" or even an allergy for another user. For example, a dissimilarity or mismatch would be found between user profile 905 and user profile 925 because user profile 905 includes "pirates" in the trait category "subject likes," while user profile 925 includes "pirates" in the trait category "subject dislikes." Similarly, a dissimilarity or mismatch would be found between user profile 945 and both user profiles 905 and 925 because user profile 945 includes "peanuts" in the trait category "food likes," while user profiles 905 and 925 identify "peanuts" under "allergies." Such dissimilarities or mismatches can be weighted by a multiplier as discussed above with respect to similarities, and can be used to affect similarity rankings by subtracting 1 shared trait (or a weighted value, such as 1.5 or 0.5) from the ranking.

Sometimes, the EaaS platform 230 may generate requirements based on certain traits that are determined to be extremely important. For example, the "allergies" trait is very important in that if a user eats or is otherwise exposed to something that they are allergic to, there could be severe medical consequences for that user. Therefore, EaaS platform 230 may generate a requirement that any recommended POIs be safe for someone with that allergy and/or that any user deemed to be similar must be similar at least in terms of allergies.

FIG. 10 illustrates a recommended itinerary map interface for two users in which certain recommendations are generated based on similarities to other users.

The recommended itinerary map interface 1000 of FIG. 10 may be one implementation of a dynamic venue map 202 as discussed with respect to FIG. 2 and/or a personalized itinerary 302/304 as discussed with respect to FIG. 3. In particular, the recommended itinerary map interface 1000 of FIG. 10 maps a personalized itinerary including recommended POIs and user-selected POIs for two users "Matt" and "Sam" within a map 1090 of a venue selected to be Eastern North America. The recommended itinerary map interface 1000 of FIG. 10, in this way, is similar to the recommended itinerary map interface 600 of FIG. 6, though it incorporates recommended POIs based on similar users as discussed with respect to FIG. 9.

The recommended itinerary map interface 1000 of FIG. 10 identifies a past POI 1005 as the port of New York, which the users "Matt" and "Sam" were both at previously. A first recommended POI 1010 is provided by the EaaS platform 230 as "Cruiseline Burger Grill." The recommended POI 1010 is recommended based on its location being along an existing or planned route (from the current location of both users 1030 to selected POI 1015) and based on the POI 1010 ("Cruiseline Burger Grill") having high ratings (an indicator of positivity) from Betty, a user that the EaaS platform 230 determined to have similar food preferences (a shared trait) to both Matt and Sam. While in this example, Betty was identified as similar to both Matt and Sam, it should be understood that the same POI may have been recommended if Betty was identified as only similar to Matt or only similar to Sam.

A second POI 1015 along the personalized itinerary is user-selected by Sam—Flamenco Beach in Culebra. A third POI 1020 along the personalized itinerary is recommended by the EaaS platform 230 as "Miami Surf Lessons" based on its location being along an existing route (from the user-selected POI 1015 back to the port of New York 1005) and based on a prior recommendation that the EaaS platform 230 made for Jane, who the EaaS platform 230 determines is similar to Sam in that Jane also selected the second POI 1015, Flamenco Beach in Culebra (which is a shared trait between Sam and Jane).

While the recommended itinerary map interfaces 400, 500, 600, and 1000 of FIG. 4, FIG. 5, FIG. 6, and FIG. 10 respectively, are all maps, it should be understood that a personalized itinerary can take the form of a list of POIs, either in order of when they should be visited or in a different order.

The resulting map interface 1000 illustrates a journey line 1080 representing a path connecting the POIs 1005, 1010, 1015, 1020, and back to 1005, the journey line 1080 also connecting the current location 1030 of the users. In some cases, a path 1080 may be somewhat pre-set, as in a pre-set cruise, in which case recommended POIs may be recommended because they are along that path 1080 and one or more additional reasons, such as similarity to "likes" of one or more of the users or dissimilarity to "dislikes" of one or more of the users or any of the other reasons identified above.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

While the foregoing written description enables one skilled in the art to make and use what is considered presently to be the best mode thereof, those skilled in the art will appreciate in light of the disclosure that the existence of variations, combinations, and equivalents of the specific aspects, embodiments, structures, modules, methods, and examples herein. The disclosure should therefore not be limited by the above described examples, but by all aspects of the present teachings within the scope and spirit of the disclosure.

What is claimed is:

1. A method for itinerary personalization for a first venue attendee of a plurality of venue attendees in a predetermined venue area, the method comprising:
    receiving, from a mobile device associated with the first venue attendee, a location of the mobile device associated with the first venue attendee;
    retrieving a plurality of venue attendee profiles including at least a first venue attendee profile corresponding to the first venue attendee and a second venue attendee profile corresponding to a second venue attendee, wherein each venue attendee profile identifies a plurality of traits about one of the plurality of venue attendees;
    identifying that the first venue attendee is similar to the second venue attendee based on identifying at least a first shared trait common to both the first venue attendee profile and the second venue attendee profile;
    retrieving locations of a plurality of points of interest located within the predetermined venue area;
    selecting a recommended point of interest for the first venue attendee from the plurality of points of interest based on the recommended point of interest being within a predetermined range of the location of the mobile device associated with the first venue attendee, an indicator of positivity regarding the recommended point of interest and corresponding to the second venue attendee, and the prior identification that the first venue attendee is similar to the second venue attendee; and
    sending at least the recommended point of interest to the mobile device associated with the first venue attendee.

2. The method of claim 1, further comprising generating a personalized itinerary including at least the recommended point of interest and a second point of interest of the plurality of points of interest, wherein sending at least the recommended point of interest to the mobile device associated with the first venue attendee includes sending the personalized itinerary to the mobile device associated with the first venue attendee.

3. The method of claim 1, wherein identifying that the first venue attendee is similar to the second venue attendee is based on identifying that the first venue attendee profile and the second venue attendee profile have a highest number of shared traits in common compared to a plurality of pairings of the first venue attendee profile with each of the plurality of venue attendee profiles other than the first venue attendee profile.

4. The method of claim 1, wherein the first shared trait common to both the first venue attendee profile and the second venue attendee profile is a dietary restriction.

5. The method of claim 1, wherein the first shared trait common to both the first venue attendee profile and the second venue attendee profile is an age group.

6. The method of claim 1, wherein the first shared trait common to both the first venue attendee profile and the second venue attendee profile is an occupation.

7. The method of claim 1, wherein the first shared trait common to both the first venue attendee profile and the second venue attendee profile is an area common to a location history of the mobile device associated with the first venue attendee and a location history of a mobile device associated with the second venue attendee.

8. The method of claim 1, further comprising receiving a selection by the first venue attendee of a selected point of interest of the plurality of points of interest from the mobile device associated with the first venue attendee, wherein the first shared trait common to both the first venue attendee profile and the second venue attendee profile is selection of the selected point of interest.

9. The method of claim 1, wherein the indicator of positivity about the recommended point of interest corresponding to the second venue attendee is a rating by the second venue attendee that exceeds a predefined threshold corresponding to positivity.

10. The method of claim 1, wherein the indicator of positivity about the recommended point of interest corresponding to the second venue attendee is a review by the second venue attendee that includes one or more phrases corresponding to positivity.

11. The method of claim 1, wherein the indicator of positivity associated with the recommended point of interest and corresponding to the second venue attendee is a selection of the recommended point of interest by the second venue attendee for an itinerary associated with the second venue attendee.

12. The method of claim 1, wherein the indicator of positivity associated with the recommended point of interest and corresponding to the second venue attendee is a recommendation generated for the second venue attendee.

13. The method of claim 1, wherein selecting the recommended point of interest for the first venue attendee from the plurality of points of interest is also based on the recommended point of interest fulfilling one or more requirements generated based on the first venue attendee profile, the one or more requirements associated with compliance with one or more preferences of the first venue attendee.

14. The method of claim 1, wherein selecting the recommended point of interest for the first venue attendee from the plurality of points of interest is also based on the recommended point of interest fulfilling one or more requirements generated based on the first venue attendee profile, the one or more requirements associated with avoidance of one or more dislikes of the first venue attendee.

15. A system for itinerary personalization for a first venue attendee of a plurality of venue attendees in a predetermined venue area, the system comprising:
- a communication transceiver that receives a location of a mobile device associated with the first venue attendee and sends a recommended point of interest to the mobile device associated with the first venue attendee;
- a memory that stores instructions, locations of a plurality of points of interest located within the predetermined venue area, and a plurality of venue attendee profiles including at least a first venue attendee profile corresponding to the first venue attendee and a second venue attendee profile corresponding to a second venue attendee, wherein each venue attendee profile identifies a plurality of traits about one of the plurality of venue attendees; and
- a processor, wherein execution of the instructions by the processor causes the processor to:
- identifying that the first venue attendee is similar to the second venue attendee based on identifying at least a first shared trait common to both the first venue attendee profile and the second venue attendee profile, and
- selecting the recommended point of interest for the first venue attendee from the plurality of points of interest based on the recommended point of interest being within a predetermined range of the location of the mobile device associated with the first venue attendee, an indicator of positivity regarding the recommended point of interest and corresponding to the second venue attendee, and the prior identification that the first venue attendee is similar to the second venue attendee.

16. The system of claim 15, wherein the communication transceiver receives the location of the mobile device associated with the first venue attendee from the mobile device associated with the first venue attendee.

17. The system of claim 15, wherein the communication transceiver receives the location of the mobile device associated with the first venue attendee from a point of sale (POS) terminal within the predetermined venue area.

18. The system of claim 15, wherein the communication transceiver receives the plurality of venue attendee profiles from one or more network servers.

19. A method for itinerary personalization for a first venue attendee in a predetermined venue area, the method comprising:
- receiving a location of a mobile device associated with the first venue attendee;
- storing profile information identifying a first plurality of traits of the first venue attendee and a second plurality of traits of a second venue attendee;
- identifying a first shared trait that is common to both the first plurality of traits and the second plurality of traits;
- storing locations of a plurality of points of interest located within the predetermined venue area;
- selecting a recommended point of interest for the first venue attendee from the plurality of points of interest based on the recommended point of interest being within a predetermined range of the location of the mobile device associated with the first venue attendee, an indicator of positivity regarding the recommended point of interest and corresponding to the second venue attendee, and the prior identification that the first venue attendee is similar to the second venue attendee; and
- sending at least the recommended point of interest to the mobile device associated with the first venue attendee.

20. The method of claim 19, further comprising storing additional profile information identifying traits corresponding to a plurality of venue attendees other than the first venue attendee, wherein the second venue attendee is selected from the plurality of venue attendees other than the first venue attendee based on identifying the first shared trait that is common to both the first plurality of traits and the second plurality of traits.

* * * * *